Dec. 9, 1952 P. E. KLEINEBERG ET AL 2,621,039
SIGNATURE FLATWISE GATHERING MACHINE
Filed June 28, 1947 12 Sheets-Sheet 2
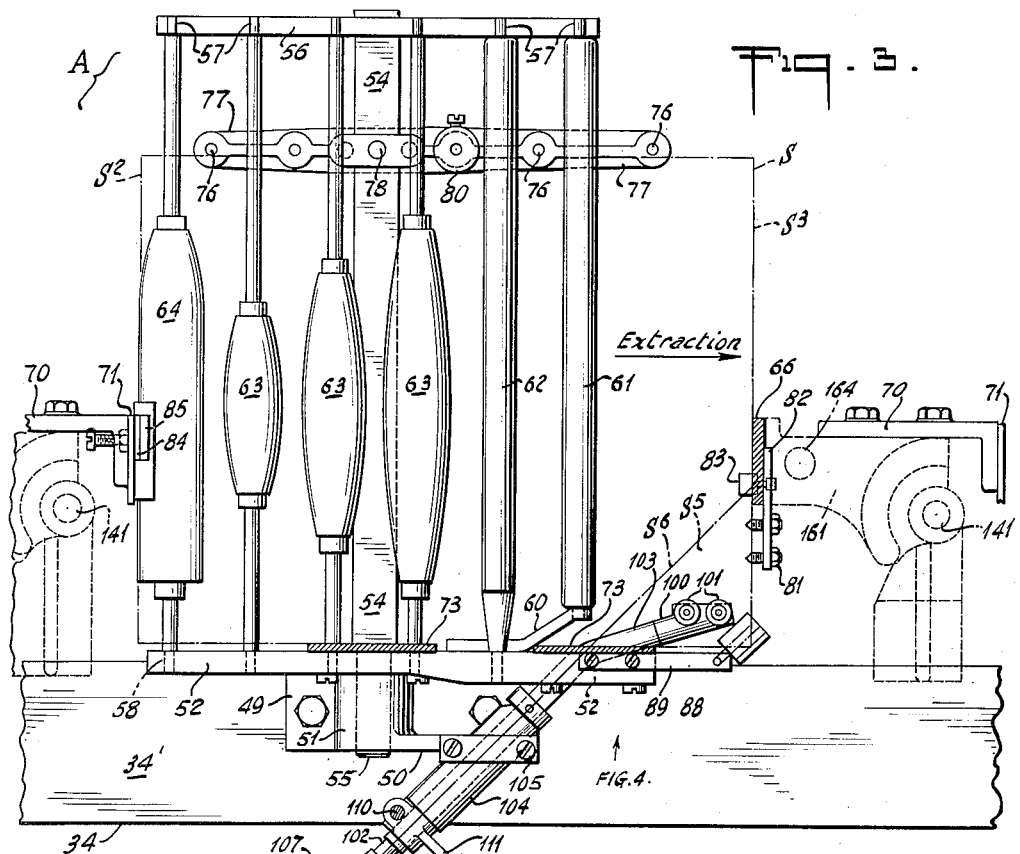
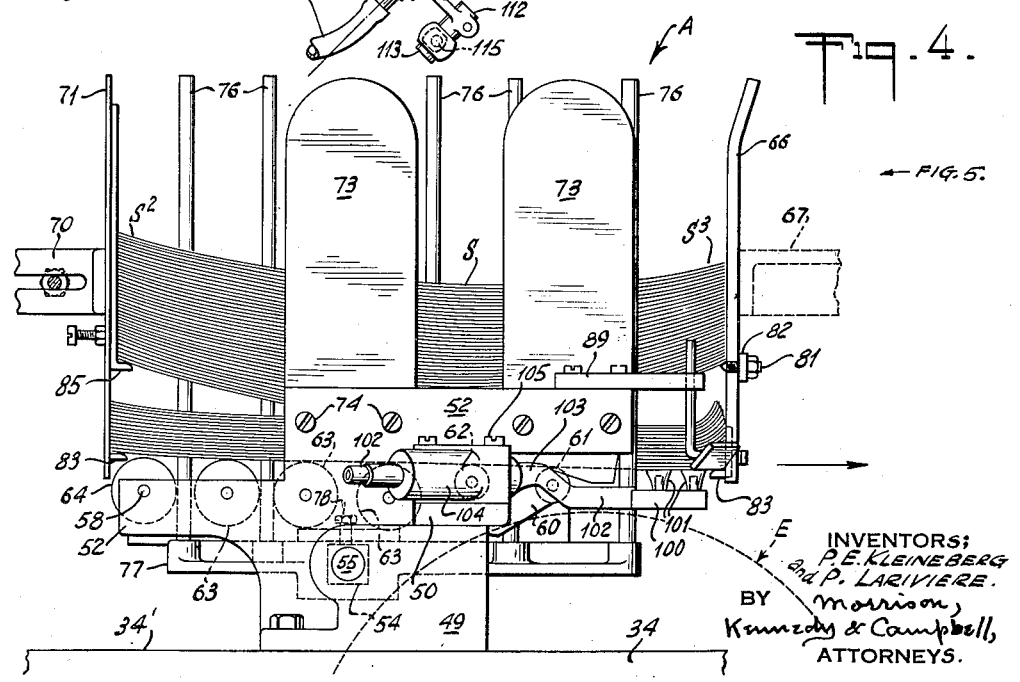
INVENTORS;
P. E. KLEINEBERG
and P. LARIVIERE.
BY Morrison,
Kennedy & Campbell,
ATTORNEYS.

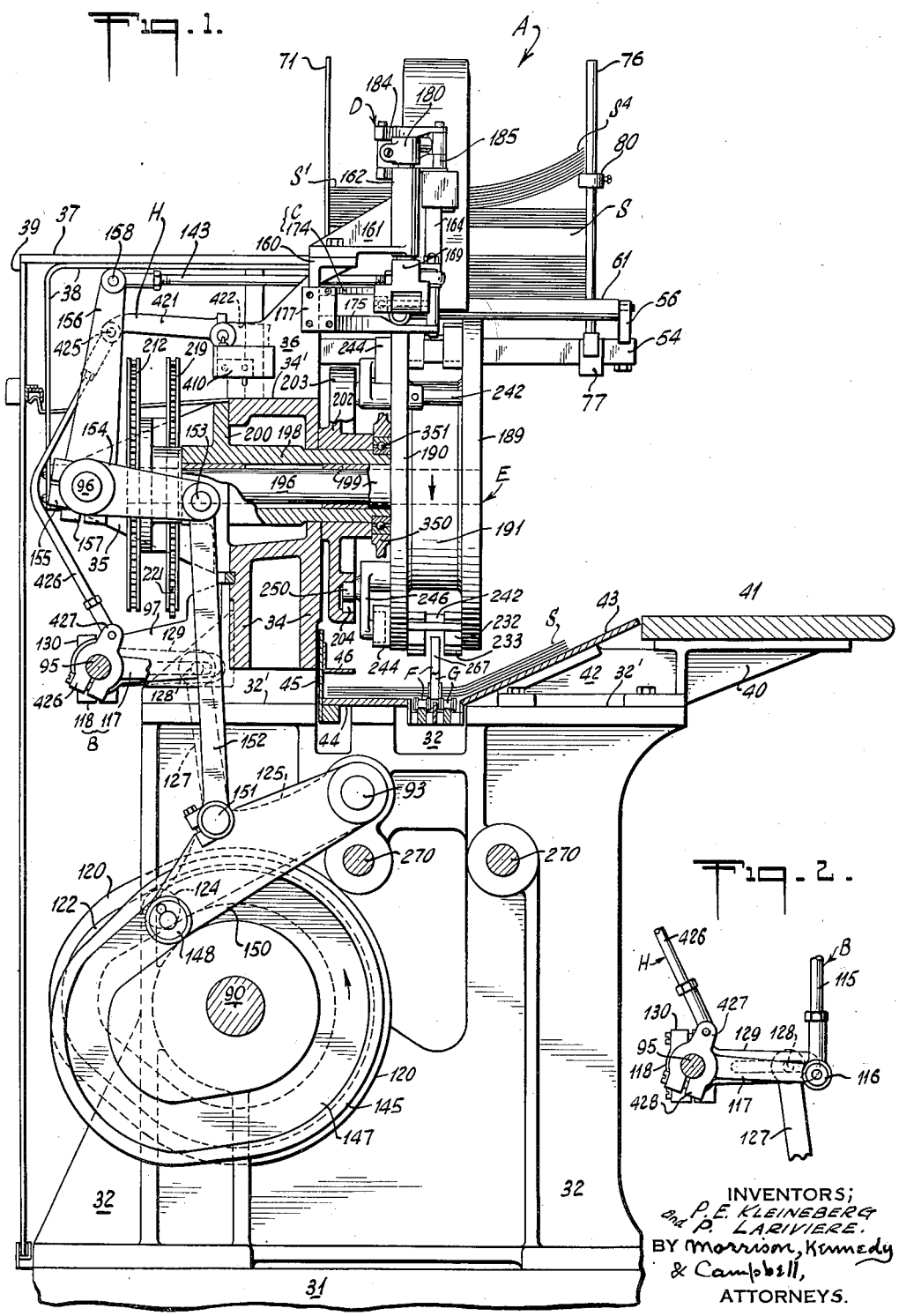

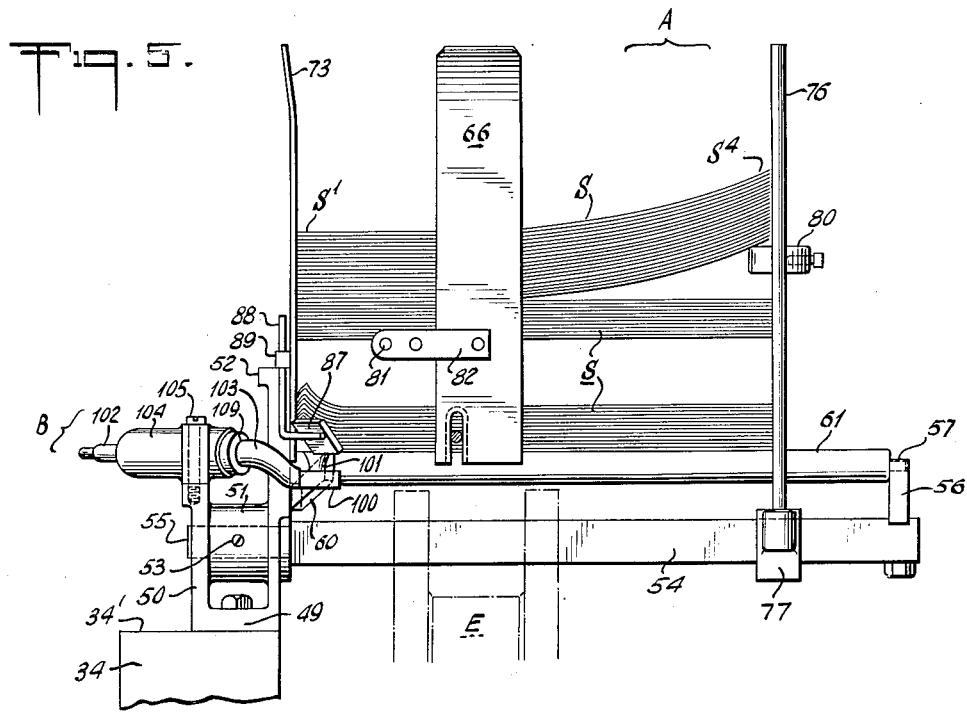
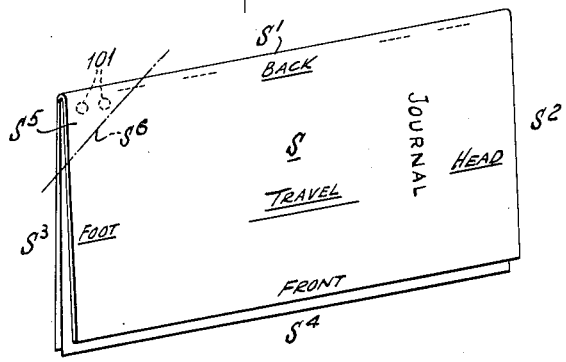

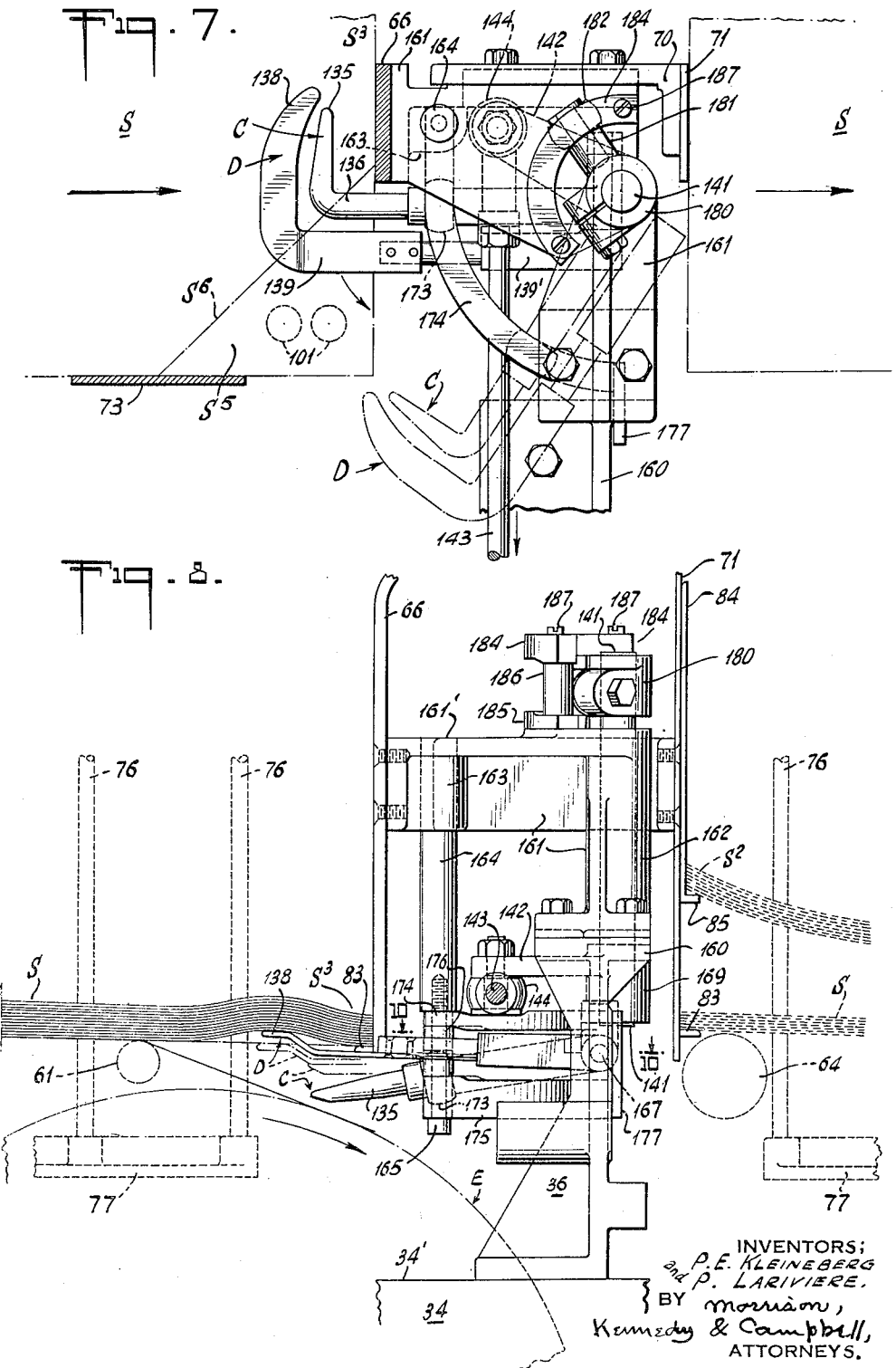

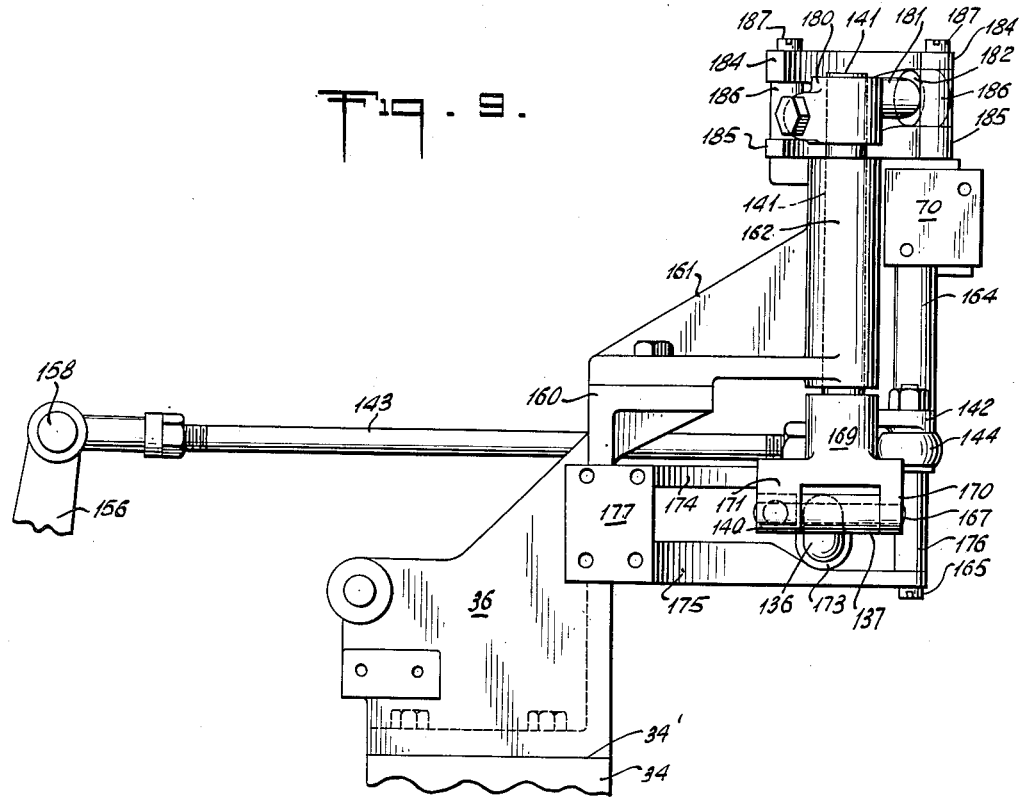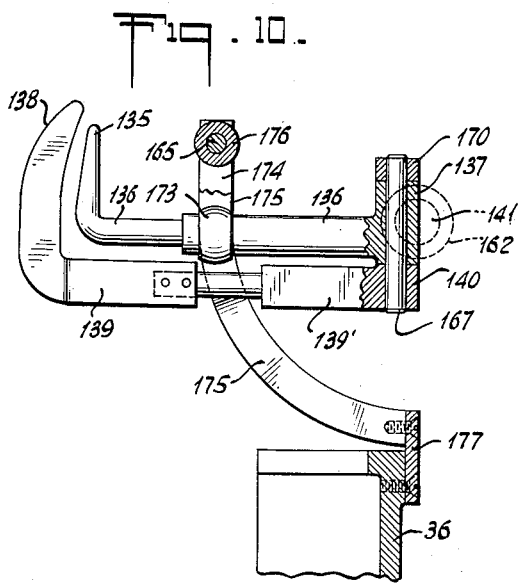

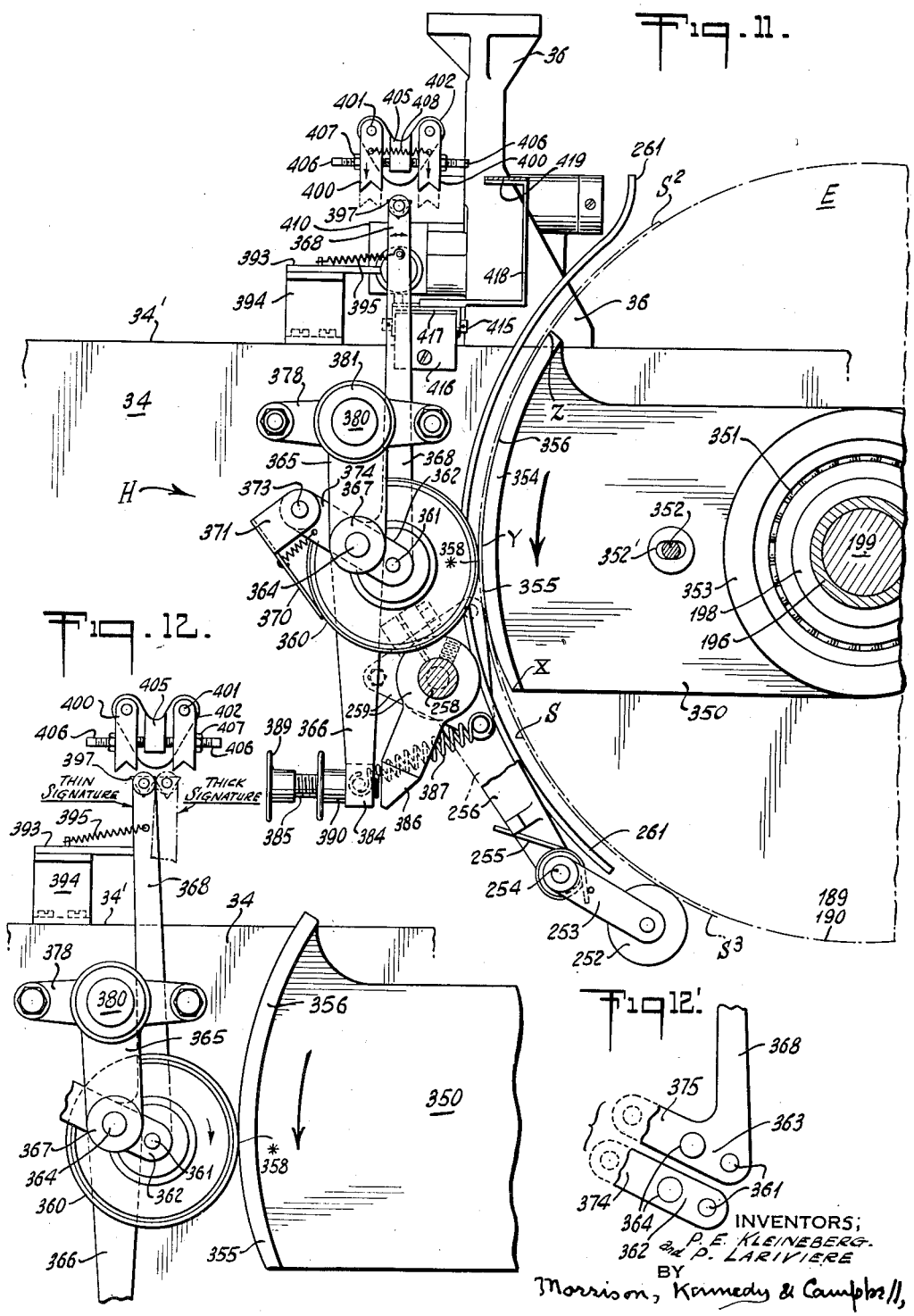

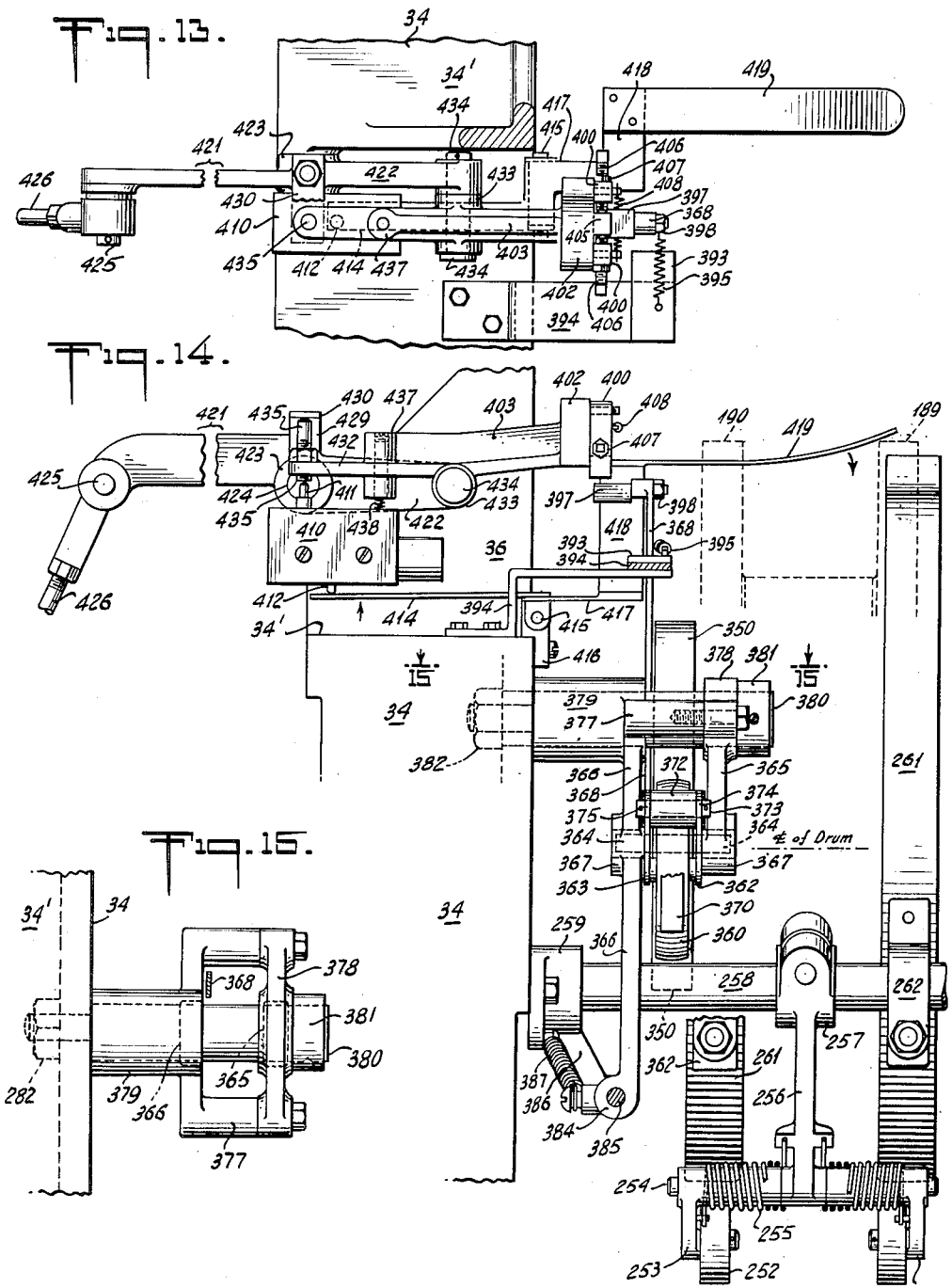

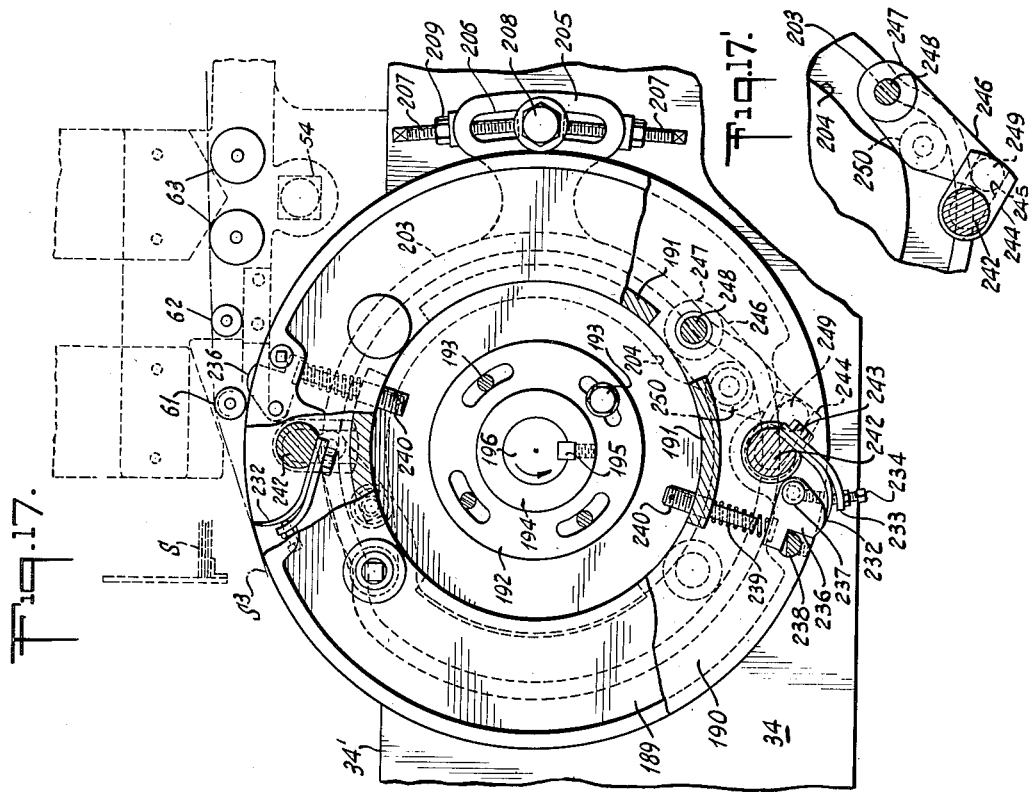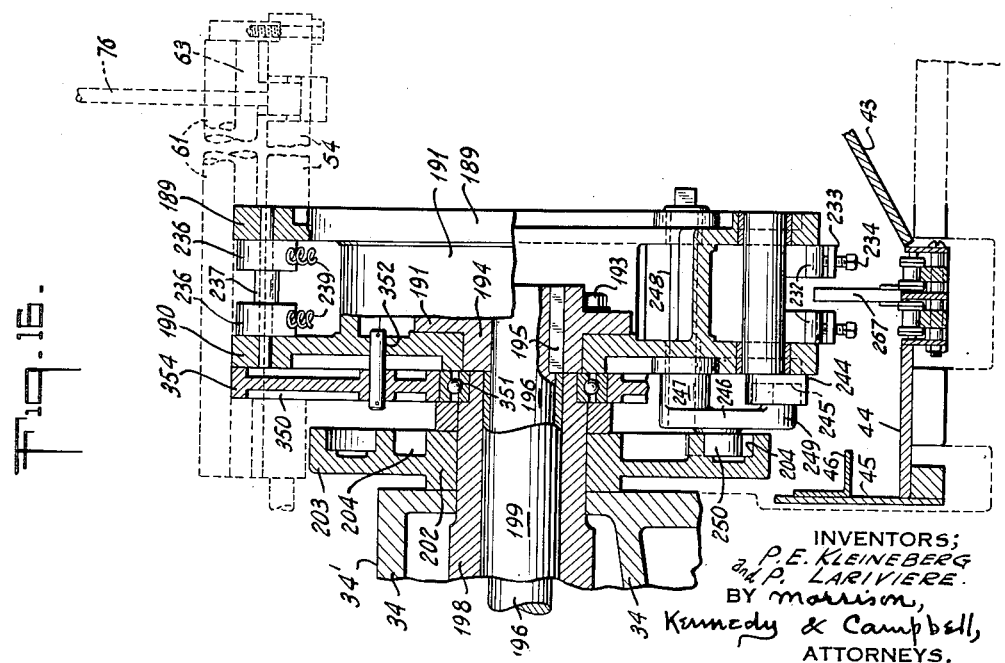

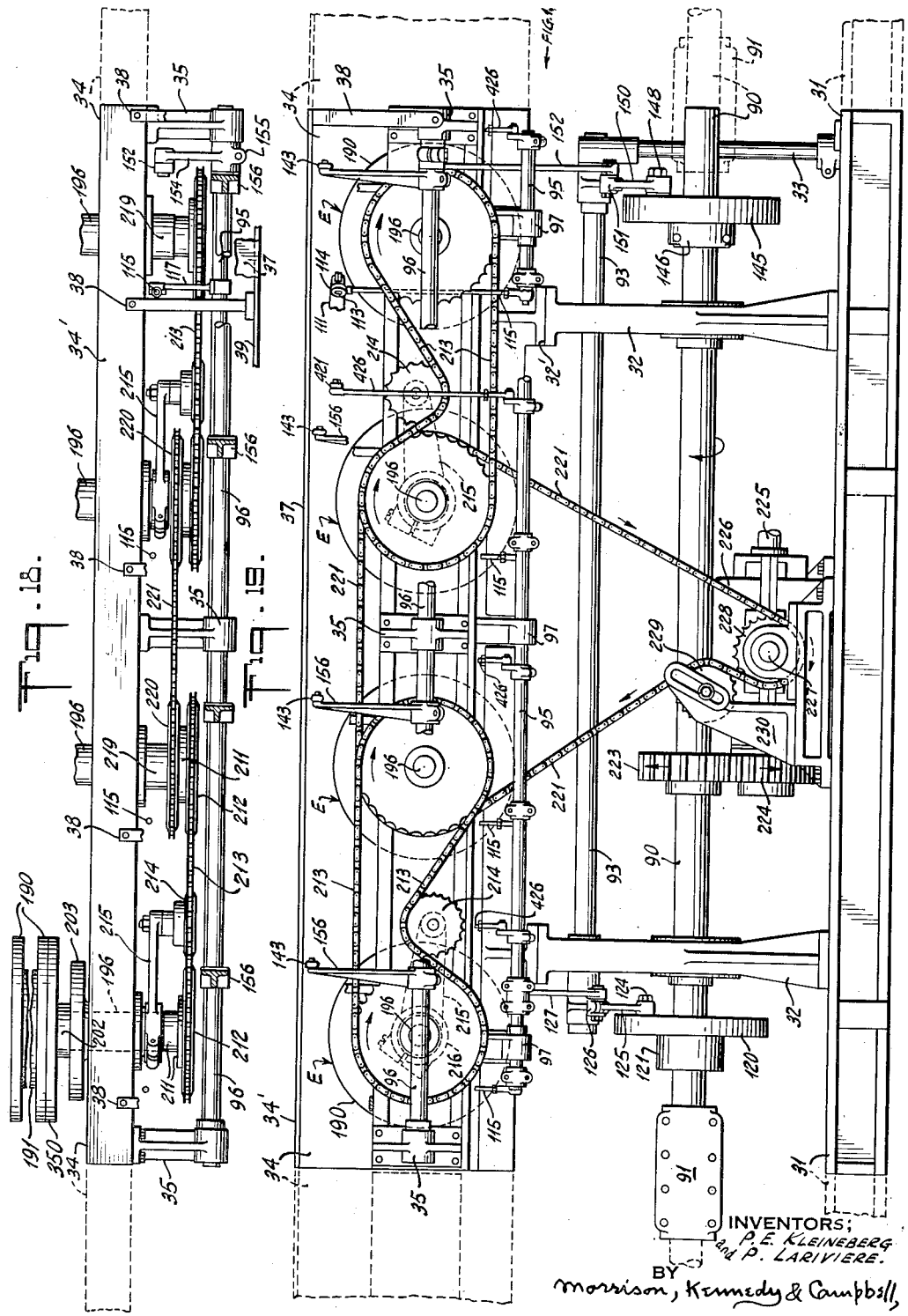

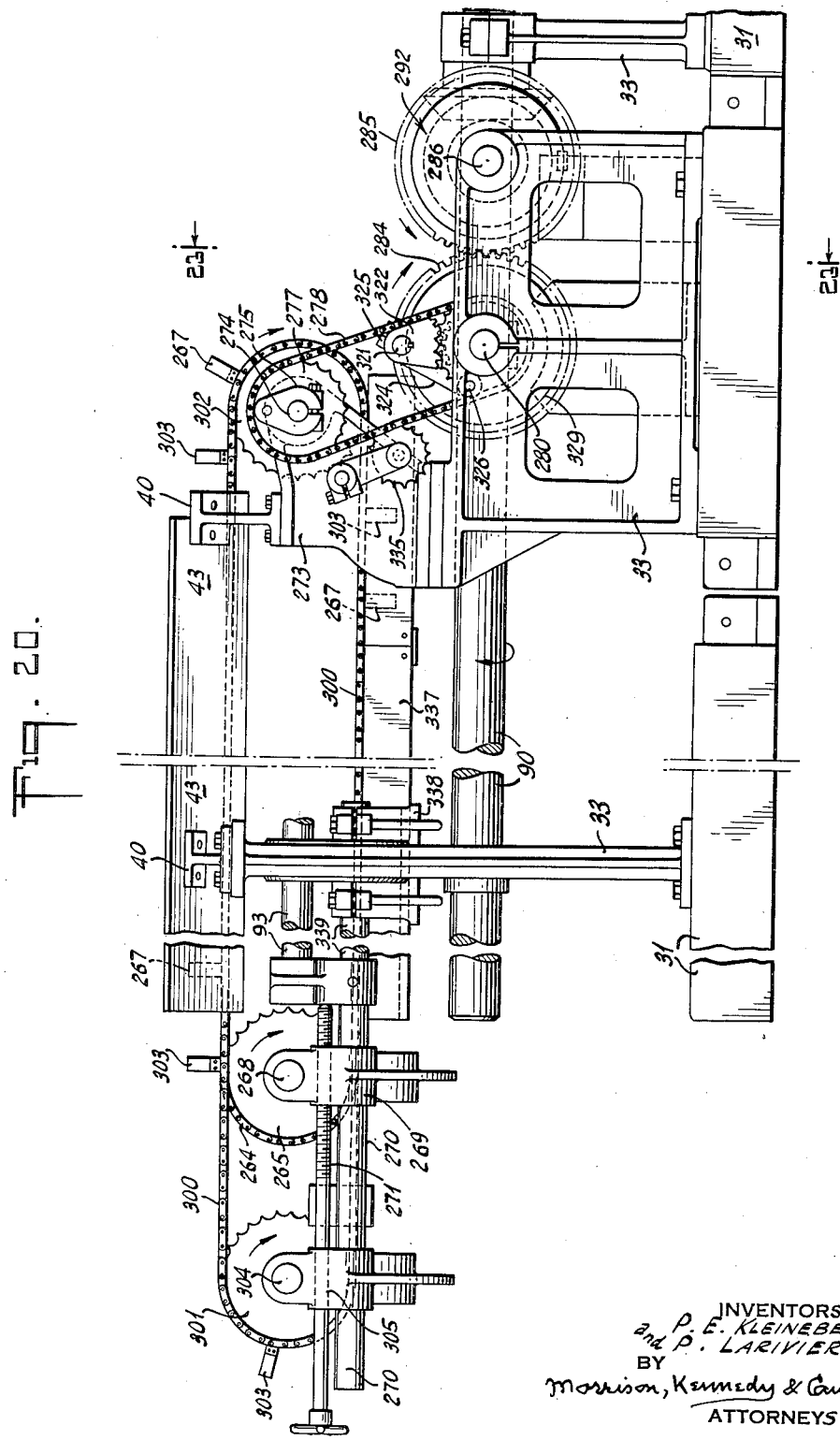

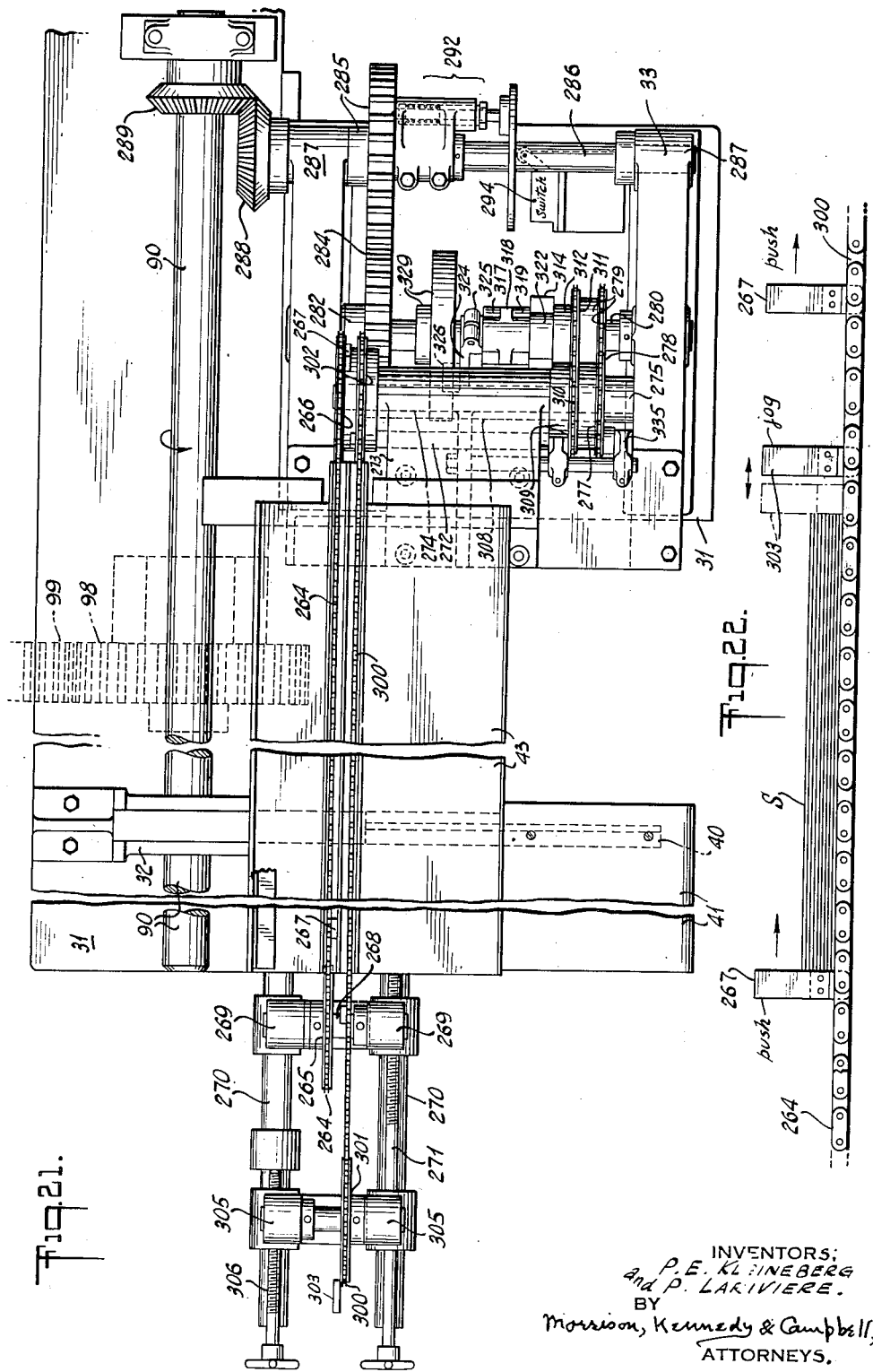

Dec. 9, 1952
P. E. KLEINEBERG ET AL
2,621,039
SIGNATURE FLATWISE GATHERING MACHINE
Filed June 28, 1947
12 Sheets-Sheet 12
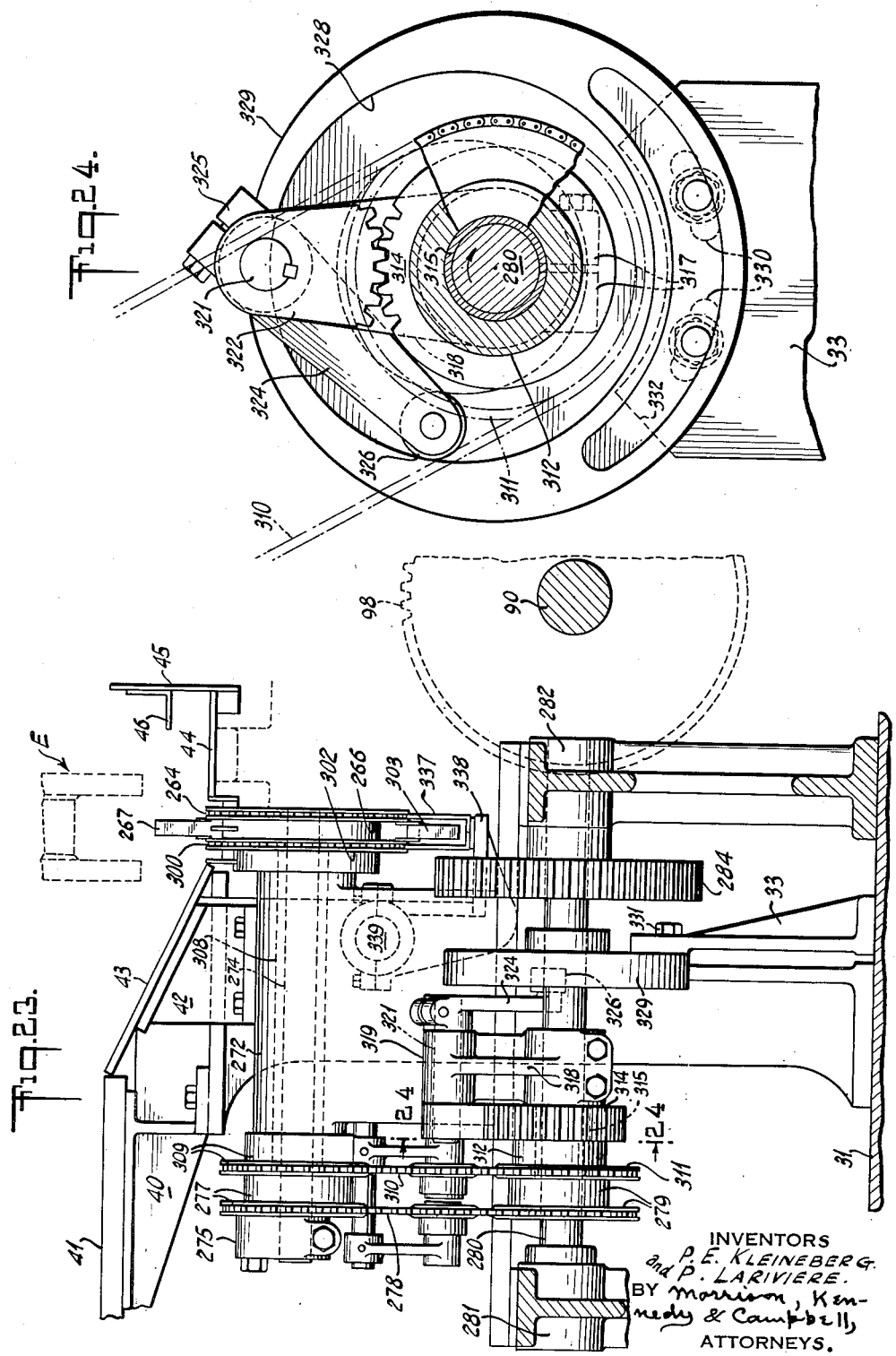
INVENTORS
P. E. KLEINEBERG
and P. LARIVIERE.
BY Morrison, Kennedy & Campbell,
ATTORNEYS.

Patented Dec. 9, 1952

2,621,039

UNITED STATES PATENT OFFICE 2,621,039

SIGNATURE FLATWISE GATHERING MACHINE

Paul E. Kleineberg, Easton, Pa., and Pierre Lariviere, Champlain, N. Y., assignors of one-half to T. W. & C. B. Sheridan Company, New York, N. Y., and one-half to The Sheridan Iron Works, Champlain, N. Y., both corporations of New York Application June 28, 1947, Serial No. 757,846

19 Claims. (Cl. 270—54)

This invention is an improved signature flatwise gathering machine, that is, a machine adapted for the extraction of signatures, which term includes single sheets, from a succession of stacks thereof and their discharge unopened to a continuously advancing conveyor, upon which the successive signatures become grouped flatwise and travel along through the length of the machine, as the groups accumulate, and therebeyond are delivered for further operations, such as attaching or stapling together the signatures of each group, so as to constitute a book or magazine, and in some cases applying covers thereto. Such kind of gatherer is distinguished from an insert or saddle gatherer wherein the signatures are opened en route and assembled astride a traveling saddle conveyor.

A general object of the present invention is to afford a flatwise gathering machine of exceedingly high speed of operation and increased rate of output of signature groups, involving the coordination of the several component mechanisms of the machine to give the desired high speed without introducing operative drawbacks. To carry out this important purpose, the operations of extraction of successive signatures from each of the stacks and the transfer and discharge thereof to the conveyor are herein performed by a rotary means, preferably in the conventional form of a continuously rotated drum carrying grippers to grip the signatures for extraction and to release them for discharge.

Further objects include relative simplicity of structure and action, along with compactness of mechanism; the several coordinated component mechanisms being specifically improved to afford a faster rate of output than with heretofore known flatwise gathering machines.

Other objects and advantages will be pointed out in the hereinafter following description of an illustrative embodiment of the invention or will be understood by those conversant with the subject. To the attainment of such objects and advantages the present invention consists in the novel flatwise gathering machine and the novel features of combination, operation, arrangement and structure herein illustrated or described.

The nearest known prior art consists of the machine shown in the following mentioned U. S. patent illustrating certain general principles of flatwise gathering which are utilized also in the machine of the present invention, which latter embodies also various additional features available for use upon the machine of said prior patent, and in some cases adapted also for use otherwise. Kleineberg Patent No. 2,020,321, of November 12, 1935, shows an automatic gathering machine wherein a longitudinal row or series of hoppers carry stacks of signatures each resting flatwise upon a hopper floor which is considerably inclined laterally, with the lowermost signature exposed underneath at its leading edge or margin, and combined therewith the following operating mechanisms; a suction detaching device mounted to swing bodily inward below the stack and out again to clear the stack and, while inward, to swing up and down to and from the exposed margin or a leading corner of the lowest signature, thus to engage and deflect the same downwardly from the stack; also a rotary kind of separating means for the leading edge of each signature, adapted to enter between the detached signature edge and the stack above and operating by a wedging action to depress or deflect downwardly the signature edge, while exerting lifting pressure upon a part of the stack, to relieve excessive friction and facilitate the extraction of such signature; also an extractor drum beneath each hopper, continuously rotated, and carrying grippers to grip the detached and depressed leading edge of the lowest signature, thereby to pull the signature from the stack in the extracting direction, the drum carrying or transferring the signature thence downwardly and around for release and discharge advancingly beneath the drum; and an endless conveyor longitudinally traveling with continuous advance beneath the row of stack hoppers, and conventionally shown as a chain with pusher pins, acting upon the received signatures, the pins and the signature groups partaking of the advancing travel to the final delivery point of the conveyor. Said patent shows also a calipering device or gage to detect errors in or absence of signatures during their transfer from hopper to conveyor; the same utilizing a signature gripping jaw of the drum for detecting purposes and functioning through a trip device partly carried on the drum to display a visual signal and to stop the machine for correction of the error.

The known prior machines failed to attain in full the desired advantages mentioned, and others; for example, the operating speed of certain of the mechanisms was handicapped by deficiencies in others because of practical incapability of the latter to operate at high enough speeds, such as are of the greatest industrial importance. Taking an instance, and assuming a rate of the order of 120 cycles per minute, the complete cooperative actions of the signature detacher mechanism and of the means for separating the leading edge of each lowermost signature from the stack above, in preparation for its extraction, must be performed within a time of one-half second; and moreover these actions must overlap in that while each lowermost signature is still being separated away from the stack above, for extraction purposes, the detacher must be caused to enter in between such signature and the remaining stack above and commence its detaching action upon the next succeeding signature, thus to condense and abridge the cycle and avoid a delay which may be relatively substantial in prolonging the cycle and may therefore proportionately require more machines and floor space to turn out a given edition, as of a popular magazine. Similar considerations and others pertain to the action of extracting from the hopper each detached and separated signature and drawing it away by the drum in time to permit the actions at the hopper to be repeated on schedule. The actions at the drum discharge, and the conveying along of the accumulating groups, must keep pace promptly and reliably with the above operations; while superior handling of the grouped signatures during advancing conveyance is conducive to optimum quantity and quality of product; as is also a durably reliable detection and elimination of defective signatures and groups. The present invention is believed to meet these desiderata in a manner to constitute a salient advance in the gathering department of the book or pamphlet manufacturing art.

By way of preliminary outline, and to establish terminology, the machine of this invention may be described as comprising, in addition to the long and heavy frame parts and base, the power and drive means and other general parts, the following mechanical element-groups or mechanisms constructed, arranged and interconnected for cooperative action upon the series of stacks of signatures, one stack per section, these stacks and their hoppers constituting the infeed positions of the machine, and to manipulate these supplies of signatures to convert them into a procession of flatwise gathered groups accumulated and finally delivered singly at the outfeed position of the machine, namely:

A. The elevated stack hopper in each section of the machine, providing a longitudinal series of stacks, more or less in number according to the number of signatures to be grouped in each final product; each hopper supporting its signatures flatwise, with the foremost or lowermost thereof exposed underneath at its leading edge to be pulled out longitudinally from the bottom of the stack in what may be termed the extracting direction, generally the opposite to the direction of travel of the conveyor below.

B. The suction detacher means, operating at the leading edge or corner of the lowest or bottom signature in each stack, this, on conventional lines, initiating the extraction operations for each of the successive signatures.

C. The signature separator means, operating next in order upon the signature, preparing for the extraction and comprising primarily a depressor to deflect and hold downwardly the detached signature edge.

D. The stack lifter means, as a secondary part of each separator means, this, like the depresser, reaching into the space between the detached signature and the stack above, the lifter operating to uplift partially the stack above so as to relieve the weight thereof sufficiently to insure the safe and reliable extracting of the signature.

E. The extractor means or rotary drum mechanism, having one or more sets of peripheral grippers and timed to grip each bottom signature in each hopper and draw it out from the stack in the aforesaid extracting direction generally.

F. The group conveyor or endless chain, having signature receiving or pushing means, traveling advancingly beneath the series of extractors and hoppers, thereby receiving in each conveyor pocket or space a complete series or set of signatures forming a group for final delivery.

G. The jogging means, operating alongside and in conjunction with the endless conveyor to align the successive groups following the reception of the successive signatures, thus to insure final alignment of each completed group in readiness for immediately following binding thereof.

H. The detecting means, operable in each section upon each signature, during its passage between hopper and conveyor, with caliper to gage the absence of a signature or a defect in the thickness thereof, being thereby adapted to afford any desired correction or control, such as the stoppage of the machine, together with showing a signal to indicate the location of the defect.

In the accompanying drawings is shown an illustrative embodiment of the invention wherein, on Sheet 1, Fig. 1 is a general lefthand elevation, partly broken away in vertical section through one of the drum shafts; and Fig. 2 is a similar elevation of a detail of Fig. 1.

On Sheet 2, Fig. 3 is a top plan view of Fig. 4 showing the signature hopper and associated suction detacher, the rear side of the hopper being nearest to the observer; and Fig. 4 is a rear elevation thereof.

On Sheet 3, Fig. 5 is a lefthand elevation of the hopper; and Fig. 6 is a perspective view of a typical signature with explanatory legends.

On Sheet 4, Fig. 7 is a top plan view of Fig. 8 showing the separator means, including the signature depresser and stack lifter and their operating mechanisms, the rear parts thereof being nearest to the observer; and Fig. 9 is a rear elevation thereof.

On Sheet 5, Fig. 9 is a lefthand elevation of the separator mechanism, seen as in Fig. 1, but on a larger scale and detached as a unit from the machine; and Fig. 10 is a top plan view of certain parts thereof, partly in section on the line 10—10 of Fig. 8.

On Sheet 6, Fig. 11 is a front elevation of the detector means including the calipering mechanism and certain nearby parts; Fig. 12 is a similar view of the gaging members and parts immediately actuated through them, showing positions thereof different from Fig. 11; while Fig. 12' is an exploded view of a detail thereof.

On Sheet 7, Fig. 13 is a partial top plan view of Fig. 14, which latter is a lefthand elevation of the detector mechanism including the parts shown in Figs. 11 to 13 and certain additional parts; and Fig. 15 is a top plan view of a detail thereof.

On Sheet 8, Fig. 16 is a lefthand elevation of the drum, which, like Fig. 1, is partly broken away in vertical section through one of the drum shafts, showing details of the drum; Fig. 17 is a front elevation thereof partly broken away; and Fig. 17' is a similar partial view of a detail.

On Sheet 9, Fig. 18 is a top plan view showing certain general parts of the machine, and certain other parts including the driving connections for the several extracting drums, the rear side of the machine being nearest to the observer; and Fig. 19 is a rear elevation thereof, showing certain additional parts; the drawing being based on the system of constructing the machine in structural units of four gathering sections per unit, as indicated in Figs. 18 and 19 by the dotted line extensions of the bed, the cam shaft and parts above.

On Sheet 10, Fig. 20 is a partial front elevation of the combined lower lefthand and righthand ends of the machine, the middle being largely omitted to condense the figure, and showing particularly the endless conveyor and jogger belts or chains and the drive mechanisms therefor.

On Sheet 11, Fig. 21 is a top plan view of the parts shown in Figs. 20, 23 and 24; and Fig. 22 is an enlarged front elevation of the side-by-side conveyor and jogger chains and their upstanding pins, with dotted line indication of relative jogging or pulsating movements of the latter.

On Sheet 12, Fig. 23 is a righthand elevation of the drive mechanisms for the conveyor and jogger chains shown in Figs. 20 and 21, together with various nearby parts, taken partly in section on the line 23—23 of Fig. 20; and Fig. 24 on an enlarged scale is a front elevation of certain details of said drive mechanism, shown partly in section on the line 24—24 of Fig. 23.

In various figures signatures S are shown stacked and in process of corner detachment by suction, followed by edge separation, and then extraction, discharge and accumulation into groups. A signature may be considered as composed of various numbers of sheets, as low as two or even one, but usually a considerably larger number, produced by the folding and refolding of a large printed sheet. A conventional signature S is pictured in Fig. 6, having a closed back edge $S'$, to be later bound with the other signatures of each group, as by staples, located for example as indicated. What is known as the signature head $S^2$ is preferably the trailing end or edge, the signature being extracted by its foot end or leading edge $S^3$. At the fourth side is the open front edge $S^4$.

After the separation and extraction of each signature by its leading edge $S^3$ it is transferred around and down for discharge to the conveyor, so that the conveyed signatures, and the groups thereof, are by this invention pushed advancingly by their trailing head ends $S^2$, while their back side edges travel or slide along upon the conveyor trough or raceway in contact with a gaging shoulder or wall; so that the back edges $S'$ and the head ends $S^2$ become the gaging or aligning edges for the accumulating signatures in each group, jogged into position in each conveyor section as will be described, and thus affording uniformity of assembled condition of the successive groups emerging from the final delivery.

For the purpose of suction-detaching and separation downwardly of each signature leading end below the stack, the operations are commenced at the triangular area or corner $S^5$, which is the left-rear portion as the signature lies in the hopper, adjacent to the leading edge $S^3$ and back edge $S'$; these operations, preparatory to extraction, involving a down-swinging by suction of the corner area $S^5$ about a convenient diagonal bend line $S^6$, preferably extending at an angle of 45° to the signature edges and bounding the corner $S^5$, followed by a depressing of the leading edge into the reach of the extractor. The bend line of the signature corner may be substantially at the axis of the sucker swing.

Terms of position or direction, such as front and back, left and right, herein used for facility of description, are not intended as limitations. In Fig. 1 the righthand side of the figure is considered the front, whereat the attendant can best observe the signatures and operations; so that Fig. 1 is a lefthand view, partly in section. Likewise, the longitudinal conveyor is designated as traveling rightwise as seen from the front, wherefore the extraction direction is generally the opposite, or leftwise from the stack, although obviously the entire design might be reversed.

Taking Fig. 1 as the main drawing, this shows at least some of the parts of each of the component mechanisms hereinabove designated as A to H inclusive. Thus in addition to the sectional bedplate 31 and other fixed or frame parts to be described, Fig. 1 shows at the top the hopper or stack mechanism marked A, containing supplies of signatures S; the hopper being more fully shown in Figs. 3 to 5. A minor portion of the suction detaching mechanism seen in Fig. 1 is marked B; its general principles of action being conventional, but its preferred form being shown in other figures especially Figs. 3 to 5. The separator means C, D is so marked in Fig. 1 as to its signature edge depressing mechanism C and its stack lifting mechanism D; these being shown more fully and in detail in Figs. 7 to 10. The extracting drum is well shown in Fig. 1, marked E; and this element appears in other figures, especially Figs. 16 and 17, and see also Figs. 8, 11 and 18. The conveyor mechanism is marked F in Fig. 1, showing the trough with its rear and front supporting plates and the endless conveyor chain with its group-thrusting pins; this mechanism being more fully illustrated, and its driving connections disclosed, in Figs. 20 to 24. Likewise the group jogging mechanism, marked G, is seen in Fig. 1, cooperatively adjacent to the conveying mechanism; and this and its pulsating drive being more fully shown in Figs. 20 to 24. Finally, the detecting or calipering mechanism, marked H, is represented in Fig. 1 by certain of the active parts thereof; and this is shown more completely and with details in Figs. 11 to 15 inclusive.

Above the bedplate 31 are various heavy main frame pieces and subordinate fixed members, giving support to various parts including brackets on which are mounted the various mechanisms of the machine. The total structure, as explained, is on the unit system, each unit having its own bedplate and upright walls and other fixed frame members, so that, as indicated in Figs. 18 and 19, the machine may be set up with four or eight or twelve or more sections. In each unit as best seen in Fig. 19 are two or more upright cross walls 32, the supporting top surfaces of which are designated 42'. Other uprights 33 include frame legs, columns and the like. There are also longitudinal frame members, acting as girders and supports, and extending between and beyond the cross walls; a main one of these in each unit being a hollow longitudinal frame piece or casting 34 resting atop the cross walls, this by its top surface 34' giving support to various brackets etc. and interiorly carrying the bearings for the shafts of the four extractor drums in each unit. To the rear of the horizontal frame piece 34 are triangular extensions 35 serving as rockshaft bearings, while above 34 is an upward extension piece 35, centrally located to serve as an underlying support to other fixed and movable parts.

Among the various longitudinals of the machine is a flat longitudinal member 37 serving as a shelf and extending the length of the unit at a high rear point, whereon operatives may preliminarily store and arrange batches of signatures to be intermittently transferred from such loading shelf into the hoppers A which stand directly in front thereof. The shelf 37 is supported by bent strips 38, while at the rear below the shelf is an enclosing panel 39, seen in Fig. 1, readily removable for access. An important series of brackets 40 is secured atop wall 32 at the front thereof and these brackets serve to give support to a longitudinal continuous front board 41, in the nature of a working shelf, at which the operative may bring about corrections when errors of operation have caused the stoppage of the machine.

The conveyor comprises a trough or raceway together with the traveling chain and pins protruding upwardly at a midway point thereof as will be later described. The trough is shown as comprising opposite fixed continuous plates, the front plate 43 being inclined upwardly frontly while the rear plate 44 may be flatwise, the chain running between them. The accumulating signatures, overlying the supporting plates 43, 44 have their back edges running longitudinally along the trough back wall 45 as a gage, which wall is preferably upright and carries a series of short angle pieces 46 whose horizontal portions overlie the signature edges and act as guards preventing displacement, the spaces between angle pieces accommodating the discharge of the signatures from the drum to the supporting plates 43, 44 below. Longitudinally beyond the conveyor and trough may be conventional supports and group advancing means (not shown) conducting the group procession to a binding machine or other destination.

The hopper H is best shown in the front view Fig. 1, top view Fig. 3 and rear and left elevations Figs. 4 and 5. Attached upon the top surface 34' of the longitudinal frame piece 34 is an upstanding bracket 49, of U-shape, having an upright rear extension or leg 50 spaced from the main wall 49, but the two interconnected by the bracket base and an interior bridge 51, there being a transverse bore through the parts 49, 50 and 51. The main upright wall 49 is formed at its upper part with an elongated longitudinal portion 52, being a fixed part of the hopper.

The hopper is of preferably open or skeleton structure throughout. It derives support generally from the bracket wall portion 52 and by a hopper base bar 54, extending fore-and-aft or transverse to the longitudinal dimension of the machine. The base bar 54 is secured fixedly in position by having its rear end turned down to fit the bore in the bracket 49, this turned end being shown secured in the bracket by a set screw 53. At the front end of the base bar 54 there is fixedly attached to it by an underneath bolt a longitudinal bottom bar 56, which is opposite to the longitudinal extension 52 of the supporting bracket, the floor members extending fore and aft between said fixed members 52 and 56. The actual floor consists of a number of cross members, these preferably being idler rolls or freely rotatable supports carried upon their shafts or spindles which at their ends turn in open bearing slots 57 at the top side of the longitudinal bar 56, and closed slots or bores 58 formed at the same level in the longitudinal portion 52 of the hopper bracket. By this arrangement of rolling supports the extraction of each lowermost signature is considerably eased, the character of the rolls eliminating friction at the underside of the signature being extracted.

Referring further to the rolling skeleton floor, the support of the floor rolls is by the ends of their spindles, turning in the fixed members 52 and 56, excepting that a short bent bracket 60 is used for the rear end of the final roll 61, thus to space the roll end away from the critical corner of the hopper whereat the suction detaching and the separating actions take place. The semi-final floor roll 62 is shown as a plain cylindrical roll, each signature as it is extracted leftwardly out of the hopper rolling upon the last two rolls 62 and 61. The remaining signature supports may substantially all consist of rolls, and there are next shown three rolls 63, of graduated shapes, each of which is crowned or barrelled at its central part, affording a distinct tendency to arch the central portion of the stack thereby to minimize the pressure of the second and subsequent signatures upon the one which is under extraction. The final support 64 is necessary initially to hold the trailing edges of the stacked signatures and is shown also as a revoluble element, of similar diameter to the rolls 63 and larger than the diameters of the rolls 61 and 62. The set of six illustrated rolls in each hopper is found to give improved reliability in the extraction of signatures one at a time. The crowned rolls minimize the danger of a second signature being pulled when the first is being extracted.

Coming to the four hopper skeleton walls, that which is at the lefthand side of the hopper is shown as consisting in an upright metal strip 66, a single such wall element being sufficient, and this constituting a stop, at the exit side, against which the signature leading ends $S^3$ bear when inserted into the hopper. The wall strip 66 is screw-attached to the portion 67 of a fixed bracket, the other portion 68 of which is secured to the longitudinal frame wall 34. To the front side of the bracket 67 is attached an upright angle iron 70, and each member 70 takes part in giving support to the righthand wall of the next hopper, the latter wall consisting of a single upright strip 71, the lower end of which is screw-attached to the angle iron 70.

Coming to the rear wall of the hopper, this is shown as composed of two upright strips 73, and these two strips are attached by screws 74 to the elongated top portion 52 of the hopper bracket 49. At the front the hopper is of a special construction consisting of a series of five upright rods, and these rods as a group are arranged to be adjustable rearwardly for a narrower signature and vice versa. This adjustment is provided in the fact that the lower ends of the wall rods 76 are fitted into recesses formed at the upper side of a shiftable longitudinal bar 77. The size adjustment is effected by sliding the bar 77 along upon the fixed transverse bar 54, with screw means to secure the desired adjustment. It is sufficient to effect adjustment of the front wall by shifting the rod group 76, and adjustment of the righthand wall or upright strip 71 by loosening the angle iron 70 and shifting it to a new position on the bracket 67 and securing it again to the bracket.

It is desirable to supplement the hopper by certain inwardly projecting members, which may be termed ledges, arranged to permit portions of the stack to be hitched up peripherally, above the body of the stack thus, at the stack edges where these projections are arranged, acting to relieve materially from the weight and pressure of the stack the lowermost signature, reducing the frictional resistance upon it and facilitating its extraction below the lefthand wall of the hopper. Thus on the front wall composed of the upright rods 76 there may be a series of ledge members 80, shown in Fig. 5, these being well above the hopper bottom and therefore adapted only to assume part of the weight of the upper portion of the stack when it is fairly filled with signatures. At the left wall, consisting of the upright wall strip 66 is provided a ledge consisting of adjustable screws 81 standing inwardly from a fixed supporting plate 82. As seen in Fig. 4 this device, not far from the signature corner, gives upcurved support to the leading edges $S^3$ of the stacked signatures other than a minor group of them which have escaped from the ledges. Figs. 3 and 4 show also, at the wall 66, a low ledge piece 83 consisting of a small angle piece with its lower portion projecting inwardly below the lowermost signature level, thus to minimize the possible drooping downwardly of the leading edges of the lower signatures; and a similar ledge piece 83 is attached at the foot of wall 71. At the righthand wall 71 of the hopper is shown a third style of ledge consisting of an upright strip 84 with an inbent foot 85 upon which may rest in elevated position the trailing ends of the stacked signatures above a certain elevation. In these ways the stack edges, to a material extent, are supported upwardly away from the lower signatures of the stack, relieving considerably the frictional pressure upon the lowermost signature, as stated.

It is preferably also to have a small and slightly elevated ledge or step 86, upholding the tips of a lower group of signatures, at the corner of the triangular area $S^5$ whereat the suction detacher means operates; this corner step piece assisting in protecting the signatures, above the bottom signature, from being detached and swung downwardly from the stack when the bottom signature is thus manipulated by the sucker device. This corner ledge or step 86 is supported in place upon the horizontal leg of a belt supporting rod 87 which in turn upwardly passes through and is secured to a horizontal bar 88 screw-attached on top of the longitudinal upper portion 52 of the hopper bracket 49. All described ledges or edge supports are adjustable according to the kinds and sizes of signatures.

Having described the signature hopper and before describing the suction detaching and other active mechanisms, the longitudinal main or cam shaft 90 and certain associated elements will be described. This shaft takes its bearings in the frame cross walls 32 and similar cross walls 33 near the ends of the machine. Like other main elements the main shaft is sectional, with a continuous shaft portion in each unit of the machine. The ends of the shaft portions in each unit extend freely beyond the bearings, and each two adjoining shaft sections are tightly connected by couplings 91, as best seen in Fig. 19. The main shaft carries certain cams and gears as will be further explained. This shaft may turn clockwise as seen in the left view Fig. 1. Slightly above the main shaft, and to the front of it is an axle 93, preferably fixed and serving also as a frame rod; and there are other longitudinal rods for the most part unnecessary to describe. Well above the shaft 90 and axle 93, and rearward thereof in each unit is a longitudinal rockshaft 95, and somewhat thereabove there is a second rockshaft 96; these rockshafts constituting parts of different trains of mechanisms as will be further described. The upper rockshaft 96 takes its bearings in the triangular rear brackets 35 constituting extensions of the heavy longitudinal frame member 34, while attached rear brackets 97 give bearing to rockshaft 95. The main shaft may be power driven in any suitable manner, and, being the main cam shaft of the machine it preferably makes one rotation per cycle, that is, two rotations per second if the machine output is one hundred and twenty signature groups per minute. For its drive the main shaft may carry a gear 98, Fig. 21, in mesh with a primary gear 99, driven for example from a powerful electric motor, not shown. The gear 99 may be considered the source of power for the entire machine.

The suction detaching means B is best shown on Figs. 3, 4 and 5, with actuating connections shown also in Fig. 1. A hollow head 100 may be considered the sucker member, and this is provided with one or preferably two upstanding suction cups 101, as of elastic rubber, adapted to be brought into contact with the lowest signature at its triangular corner $S^5$ to hold and lower or detach such corner from the signatures above. The swingable sucker head 100 is mounted at the end of a hollow shank 102 mounted for rotation, and with a bend or eccentric offset 103, like a crank, between the bearing and the head so as to swing the latter up and down when the shank is rotated, the sucker being well within the outline of the signature corner during its operative movements. The main portion of the shank 102 is straight and extends through a fixed bearing 104, in the form of a sleeve or barrel attached by screws 105 to the top end of the hopper bracket rear wall 50. The bearing sleeve 104 and the hollow sucker shank therein are arranged in a substantially level position, but at a decided diagonal direction, preferably 45°, thus providing a rotation axis 106 which is a continuation of the diagonal bend line $S^6$ of the signature as already described, so that when the sucker is swung up and then down it will bend the signature corner downwardly about the imaginary line constituting the sucker axis of swinging. The far or right-rear end of the sucker shank has fitted to it a flexible tubing 107 extended to a suitable or conventional suction maintaining apparatus, with controlling valves between, in order to apply and remove the suction at the proper points of time to take hold upon and later to release each signature in accordance with the cycle of operations which will be hereinbelow detailed. The function of the detacher member 100, 101 is to contact and stick to the signature underside so as to pull it down, suction being a typical means for such sticking and pulling.

The remaining mountings of the suction detacher device may be as follows, permitting the rotary or oscillating motions of the shank within the bearing sleeve 104. The straight portion of the shank, between the bearing and the bend 103 is provided with a collar 109 which turns against the end of the bearing. At the far end of the bearing the hollow shank is surrounded by a clamp member 110, and this clamp member may be the hub of a rockarm 111 extending laterally and having a swingable head 112 within which is clamped a pivot pin 113, upon which in turn is engaged the upper end or head 114 of a long drop link 115, these parts being best seen in Fig. 3 and in Fig. 1 taken with Fig. 2. At its lower end the link 115 has a pivotal connection 116 with a radial arm 117 the latter being clamped by its hub 118 to the rockshaft 95 previously described. By this arrangement the rocking of the shaft 95 transmits the to and fro motions through the elements 117, 116, 115 and 111 to cause the sucker shank to oscillate, thereby swinging upwardly and downwardly the sucker or head 100, to perform its signature corner detaching operations in accordance with the cyclical timing hereinbelow described.

The rocking of the shaft 95 through which the actuation of the suction device and connections are effected from the main or cam shaft 90 may be as follows; these connections between the main shaft and the counter-rockshaft serving also for the operation of part of the detecting mechanism H. Starting with the main shaft, this carries a large cam or disk 120 whose hub 121 is secured to the shaft, these parts being best shown in Figs. 1, 18 and 19. The cam 120 has formed within its lefthand side a cam groove 122, of a contour having a rise and a drop between long and short dwells; the contour being shown in Fig. 1 and being determinable also from the cycle of operations yet to be outlined. In the groove 122 runs a follower or roller 124, mounted at the free end of an oscillating cam lever 125, mounted to swing loosely about the fixed axle 93. At a midway point the lever is provided with a pivotal connection through which the lever actuates an upwardly extending link 127, the upper end of which has a pivotal connection 128 with a rockarm 129 secured to the rockshaft 95 by a collar or clamping hub 130. The pivot 128 is of a kind that is adjustable as to the length of the radial arm 129, this being provided through a longitudinal slot in the arm engaged adjustably by a pivot pin at the top of the link 127; thereby permitting the angular throw or oscillation of the rockshaft 95 and the movements of the trains of parts actuated thereby to be adjusted at will.

Coming to the separator mechanism this, as already explained, comprises two separate but closely associated mechanisms, C the signature edge depresser means and D the stack lifting means. These parts are best shown in Figs. 7 to 10 taken with the left view Fig. 1 and the actuating connections seen in Figs. 18 and 19. Referring first to Fig. 7 the depresser means comprises a bent finger or blade 135 at the end of the swingable shank 136, while the lifter device comprises a blade 138 at the end of its shank 139. Each of these instruments may be of L-shape as a convenient way of mounting them to swing inwardly, above the detached bottom signature, from the dotted line position seen in Fig. 7 to the full line position, the two blades swinging in unison about a vertical axis represented by the upright shaft 141 from which they take their simultaneous swinging motions. While the two instruments move in and move out in unison, preferably by swinging, the other movements are differentiated, the depresser blade 135 moving downwardly, after it has entered between the lowest signature and the stack, to insure the lowest signature reaching the drum and gripper; the lifter blade at the same time moving upwardly to apply lifting pressure to the stack to ease the friction on the lowest signature thereby to assist extraction. In each case the down or up movement may, and preferably does, commence during the inward shift or swing, thus to conserve time; and these down and up movements may comprise dwells for refinement of action, as will be explained hereinbelow in summarizing the preferred total cycle of actions. The inswinging shift of the separator blades into the gap is superior to a straightline or sliding entry, reducing vibration and permitting diagonal entry over the signature corner, where the gap is widest.

As the illustrated separating mechanism C, D is organized the same means which shifts the blades inwardly and outwardly serves also to cause the predetermined down and up movements of the blades. Leaving these latter movements for later description, the swinging movements take place about the upright shaft 141, which is fitted to rock through a substantial angle, illustrated by the difference in the full line and dotted line positions in Fig. 7. Specifically when, through shaft 141, the blades are swung in or out, these motions cooperate with fixed cams to be described, one for the depresser blade and the other for the lifter blade to afford their down and up movements. By this arrangement it is only necessary to provide for the correctly timed rocking movements of the upright shaft 141 in order to deliver all of the described actions to the two mechanisms of the separator means.

The rocking of upright shaft 141 may be brought about through a radial rockarm 142 extending frontwardly and leftwardly as seen in dotted lines in Fig. 7, this arm being swung by means of a long link 143, which only has to be moved frontwardly and rearwardly to cause the complete motions of the mechanism, a pivot 144 connecting 143 with 142. For convenience the actuation of this train of elements 143, 142, 141 will be described in advance of the details of the separator mechanism. The actuating connections to the long fore-and-aft link 143 are best shown in Figs. 1, 18 and 19. On the main cam shaft 90 is a cam disk 145 whose hub 146 is fast on the shaft, near the left end of each section of main shaft. The groove 147 in the face of the cam disk is well shown in Fig. 1 as comprising a rise and a drop of contour between two extended dwells, the cam rise acting upon the follower roll 148 causing the inward movements of the separator blades. A cam lever 150 is fulcrumed on the same rod or axle 93 as the lever 125 already mentioned, the lever 150 having at a middle point a pivot 151 by which the lever is connected with an upwardly extending link 152, the top end of which in turn is pivoted at 153 to a rockarm 154 whose hub 155 is clamped fast upon the rockshaft 96 already mentioned. At another point upon this rockshaft is an upwardly extending rockarm 156 secured by clamp 157 to the rockshaft. By this arrangement the motions derived from the cam 145 are communicated as fore-and-aft swinging movements of the upstanding lever 156 which in turn is connected by a pivot 158 to the rear end of the long horizontal link 143 already mentioned.

The general bracket 36, serving both for the separator means and part of the detector means, is formed with an upper front extension 160 upon the top of which is mounted an irregular separator bracket 161, as seen in Fig. 1 and Figs. 7 to 10, this bracket having a tubular upright extension or bearing 162 for the upright axle or rockshaft 141, already mentioned, one of the transmitting parts of the separator mechanism. At its upper part the bracket 161 has a rightward extension which provides a tubular boss or socket 163 within which is fixed a depending post or rod 164 for the support, at its lower end, of certain parts of the mechanism, a bolt 165 extending upwardly from below and being threaded into the lower end of the post to hold such other parts between the bolt head and post end.

As already stated, the adjacent blades 135 and 138 have to shift in and out horizontally in unison while at the same time moving up and down oppositely, during the separating actions. For mounting the blades to receive their movements the following is an example. The depresser blade 135 has its shank 136 extended at 136', the left extremity of which is formed into a hub 137, which turns upon a horizontal pivot pin 167, best seen in Figs. 9 and 10 thereby permitting the depresser to swing down and up. Likewise the shank 139 of the lifter blade has an extension 139', the left end of which is formed into a hub 140 surrounding the pin 167; but instead of swinging up and down it is preferred and simpler to elevate and lower the lifter in a bodily movement with the rockshaft 141. By this mounting of the blades they are independently movable upwardly and downwardly, while compelled to shift or swing horizontally inwardly and outwardly in unison. The upward and downward movements of the blades are effected by a low fixed cam for the depresser blade and a high fixed cam for the lifter blade, so that said movements are brought about by reason of the inward and outward swingings of the blades, and are timed by the contours of said cams.

The upright rockshaft 141 has been described in regard to the means for rocking or oscillating it, through its arm 142, the long link 143 etc.; and when it rocks the shaft swings the two blades as described. The shaft 141 also has a limited vertical movement, as shown by the spaces at the ends of the shaft bearing 162, this vertical play being caused by the overhead fixed cam to be described and serving to lift and lower the stack lifter blade. This motion is communicated also, to the hub 137 of the depresser blade, unnecessarily but negligibly. The shaft 141 is shown as provided at its low end with a collar 169, which may also be the hub of the rock-arm 142, and this collar at its lower portion is forked to provide two depending legs, a front leg 170 and a wider rear leg 171, with a substantial space between them accommodating the hub 137 of the depresser blade shank, the pivot pin 167 having its ends mounted in the two legs of the fork or yoke 169. The hub 140 of the lifter shank is integral or rigid with the rear leg 171 of the yoke of shaft collar 169, so that the lifter is rigid with the shaft 141 and rises and lowers as well as swings in and out with it.

The fixed cam means for controlling the up and down movements of the depresser and lifter blades is illustratively shown as follows. On the shank 136 of the depresser blade is mounted a cam roller 173, which rolls around an arc concentric with the upright rockshaft 141. The roller plays between an upper cam track or race 174 of the same concentric shape and a corresponding lower cam track member 175. These cam parts have complementary contours facing each other and between which the roller travels, thus to deliver down and up motions to the depresser blade. At their front ends the cam tracks or strips are threaded on to the bolt 165, which is passed upwardly through an aperture in the lower track and thence through a spacing sleeve 176 and thence through the aperture in the upper track, so that when the bolt is tightened these parts are firmly held in position. The other or rear ends of the cam tracks 174 and 175 may be fixed in position by means of a face plate 177 to which the cam ends are secured and which in turn is secured to the general bracket 36. The contour of the cam path, between its upper and lower tracks is preferably a simple contour with a single incline between two dwells, as best shown in Fig. 9.

Similarly the up and down movements of the lifter, attached rigidly to one leg of the yoke 169 at the foot of the rockshaft 141, may be performed as follows. At the top of the rockshaft is secured by a hub clamp 180 a radial arm 181 carrying a roller 182 adapted to roll along between upper and lower fixed cam tracks 184 and 185. The lower track is shown mounted upon the top surface 161' of the separator bracket 161. By means of tubular spacers 186 the upper track 184 is properly spaced above the lower track, and these are all held rigidly in position by means of headed bolts 187 passed downwardly through apertures in the two tracks and through the spacers into threaded bores in the bracket.

The shaping of the fixed cams affords a timing of the up and down movements of both blades in a manner coordinated with the general cycle to be described; but at this point it may be mentioned that in a preferred embodiment the total swing of the two separator blades is about 56°, measured around the axis of the upright rockshaft 141. During the first part of each inswinging movement, when the blades wedge their way in between the detached signature below and the stack above, the depresser blade enters the space with a level movement, which continues for 40° of angle, and then dips or swings down for the final 16°, depressing the signature leading edge into the reach of the drum grippers. The lifter blade may have a somewhat different movement, swinging inward at a low level for about 8°, making sure of clearing the underside of the remaining stack, then rising slightly into initial contact with the stack, and only undergoing the remainder of its rise during the final 16° of swing, thus to give upward pressure against the stack about the time the extraction of the signature begins; and the total up and lown movement of the lifter blade may be of the order of ¼ inch. In respect to insuring the safe entrance of the two blades into the space between stack and signature the described swinging arrangement is of substantial advantage, affording a swinging motion under which the noses of the blades enter the space quite near to the corner of the stack, at which the space is maximum, affording maximum clearance for the inswing of the blades.

The extractor mechanism E comprises a generally conventional drum of the open or skeleton type, with grippers adapted to grip each lowest signature in the hopper for extraction, transfer and discharge to the conveyor, the drum operating on known principles but of improved structure. It rotates about a transverse axis in counterclockwise direction, looking from the front, so that the extraction of each signature is generally leftwise, the opposite to the rightwise travel of the conveyor below, using the principle of multiple gripper sets, two such sets are mounted oppositely on the drum, which therefore in its drive is geared down to rotate at half the speed of the main shaft. The drum is best shown in Figs. 1, 16 and 17, with further illustration of its drive in Figs. 18 and 19. Surrounding the drum shaft, but freely rotatable by reason of a ball bearing 351 as will be described, is shown a member 350 of the calipering mechanism, adjacently to the rear of the drum as will be further described.

The illustrated open drum structure, for each section of the gathering machine is shown as comprising a pair of circular side disks 189 at the front side and 190 at the rear side, with an interrupted cross web 191 interconnecting them about midway between the periphery and center of the drum. Interiorly arranged, as a separate casting is a circular or hub member having an outstanding flange 192 which is attached by bolts 193 to the inner side of the rear drum disk 190; and said circular casting has also a cylindrical flange 194 extending rearwardly where it is firmly connected by a key 195 to the rearwardly extending drum shaft 196.

The bearing for the rotary shaft 196 comprises a cylindrical cast piece or sleeve 198, surrounding the shaft, with one or more bushings 199 interposed. The bearing sleeve is formed with an outstanding flange 200 which is bolted against the rear side of the hollow longitudinal frame casting 34. By way of spacing the drum correctly frontwards of the hollow frame piece 34 there are shown certain spacing members between the frame piece and drum. One of these comprises a hub 202 immediately surrounding the bearing piece 198 in front of the frame piece, this conveniently being the hub of a stationary but adjustable gripper operating cam or disk 203 formed with a cam groove 204 at its front side cooperative with the gripper connections yet to be described. Other spacing elements are indicated in Figs. 1 and 16 substantially filling the space between the drum and the frame casting 34. For adjusting the fixed position of the gripper cam 203, thereby to give accurate timing of the gripper closing actions, there is shown in Fig. 17 a radial extension 205, which is concentrically elongated and formed with a slot 206, within which slot are located opposite adjusting screws 207 bearing upon a central stud 208 outstanding from the frame wall 34. By loosening one of the screws 207 and taking up the other, the angular position of the cam member 203 may be set as desired, and the adjustment fixed by means of lock nuts 209 near the outer ends of the adjusting screws.

Before describing the gripper mechanism, for convenience, will be described the preferred mode of drive of the drum shafts, in unison, remembering that there are four such drums and shafts in each longitudinal unit of the machine. A common mode of drive of multiple drums has been by the use of bevel gears, but this has proven unsatisfactory in several respects and the following disclosure is found to improve the accuracy and efficiency of drive. This mechanism is shown on Figs. 18 and 19, the latter being in rear view, the former showing the drum shafts and one of the drums, in top view. Each drum shaft extends through the longitudinal casting 34, as already described, with its ends projecting rearwardly therebeyond. The plan disclosed is a particular use of sprocket gearing; each pair of the two pairs of drum shafts in each unit being thus geared together, this arrangement being supplemented by power drive through a third sprocket gear train operating upon one of the two drum shafts of each of said pairs. Thus, at the rear end of each drum shaft, mounted thereon by a hub 211 is a sprocket wheel 212. In each pair, taking the pair appearing at the left end of Figs. 18 and 19, there is a single interconnecting sprocket chain 213, this chain passing around both of the sprockets and being held taut by an idler take-up sprocket wheel 214 which is mounted at the free end of a swinging arm 215 whose hub 216 is loose upon the drum shaft, and pressed by a spring 217 to thrust the chain into the space between the two wheels, thus insuring tight coordination between the two wheels, as well as a more extended engagement of the chain with the wheels. On account of the direction of the common drive of the two chains 213, to be described, the take-up idler 214 of the lefthand sprocket train in Figs. 18 and 19 is arranged to press upwardly on the lower stretch of chain, whereas at the righthand end the idler is pressed downwardly upon the upper stretch of chain 213.

For a common drive for the two pairs of sprocket wheels 212 the following arrangement is preferred. By their hubs 219, keyed to the middle two of the four drum shafts 196 auxiliary or secondary sprocket wheels 220 are provided, of equal size to the sprockets 212; and a driving sprocket chain 221 is arranged to pass around the two secondary sprocket wheels 219, and thence downwardly to the driving point. The driving train for the four drum shafts of each unit commences with the main or cam shaft 99, upon which is fixed a spur gear 223 which is in mesh with a spur gear 224, these having unitary ratio, the gear 224 being mounted upon the input shaft 225 of a centrally located gear box 226 attached upon the bed plate 31. The gear box contains conventional means for communicating drive at right angles, so that the output shaft 227 stands fore-and-aft or transversely of the longitudinal direction of the main shaft. Upon the shaft 227, which makes one rotation per cycle, is mounted a sprocket wheel 228, around which the chain 221 passes. This chain therefore travels around a substantially triangular path, communicating the drive to the two auxiliary sprocket wheels 220, and thence to the middle two of the four drum shafts and, through the main sprocket wheels 212 to the remaining two drum shafts. To prevent loose play in the triangularly disposed sprocket chain 221 there is provided an idler take-up sprocket wheel 229, which is adjustably mounted upon a bracket 230 secured upon the central gear box 226. Thus the four drums and their shafts in each unit of the machine are driven from and in coordination with the main shaft 90 and the other mechanisms that are driven by the latter. The extracting drums E being of the kind with two gripper sets it is necessary that the rotary speed of the drum shafts should be but half of that of the main shaft, and this is provided in the disclosed mechanism by the fact that the sprocket wheel 228 on the output shaft of the gear box is of one-half the diameter and one-half the number of teeth of the drum shaft sprocket wheels 220 and 212.

Returning to the drum and its two gripper sets, Figs. 1, 16 and 17, each gripper comprises its swingable jaw 232 cooperating with a fixed abutment 236, the jaw being shown open at the upper side of Fig. 17 and closed at the lower side. There is shown a means for adjusting the pressure of each gripper when closed against the abutment, this consisting in a back finger 233, outwards of the jaw 232, the finger being heavier and stiffer, and provided with a headed screw 234 extended through the extremity of the finger and adapted to flex elastically the gripper jaw to determine its cooperation with the abutment.

The abutment 236 is made adjustable by swinging about a pivot 237, and the extent of protrusion of the convex outer part of the abutment beyond the periphery of the drum being predeterminable by the setting of a stud 238, adapted to be turned to change its adjustment, and having a flattened end where it bears against a shoulder of the abutment, the setting of the stud being fixed by an exterior set screw. The abutment is held swung outwardly against its stop stud 238 by means of a strong compression spring 239 extending between the swingable end of the abutment and one of the portions of the cross web 191 of the drum. The spring being a coil spring is maintained in its proper disposition by means of an interior rod 240, which can also act as an adjustable stop to the inward yield of the abutment, being terminated for that purpose somewhat short of the normal position of the abutment. The yield permitted by the spring 239 when the gripper jaw is pressed against the abutment, with signatures of variable thickness between them, prevents excessive gripping pressure, in effect the compressed strength of the spring predetermining the extent of mechanical gripping pressure upon the paper.

Returning to the gripper jaw 232 and its back finger 233, these are mounted upon a gripper spindle 242, which extends through both disks 189 and 190 of the drum, in which it takes its bearing. A bolt 243 is shown securing the jaw and finger tangentially to the spindle, which may be flattened for the purpose. The operating connections for swinging the gripper jaw may be as follows. The stationary gripper cam 203, with its cam groove 204, already described, constitute the source of actuation and timing of the gripper movements, brought about by the bodily rotation of the drum with its two gripper sets. The gripper spindle 242 by which the gripper is swung, extends rearwardly beyond the drum disk 190, where it is provided with a short radial arm 244, in the nature of a crank, with radial slot 245, the swinging of this crank arm causing the oscillation of the spindle to swing the grippers, of which two are shown in each set. Each gripper in each cycle has to be swung through an angle to carry it from the position shown at the top of Fig. 7 to that shown at the bottom, an angle of the order of 135°, the upper gripper being shown in readiness to swing over to the abutment 236 to grip the leading edge of the lowermost signature, as the gripper device passes the gripping point. The gripper swing has to be a quick action, bringing the jaw against the outer surface of the abutment while the signature edge $S^3$ is between them.

These gripper movements, by which the jaws are closed at one point in the drum rotation and thereafter open for the release and discharge of the signature are herein brought about by means of a cam lever 246, carried around with the drum, and having its hub 247 mounted upon a transverse pivot shaft or axle 248 having its bearings in the drum disks. At its outer or free end the cam lever 246 is provided with a stud or roller 249 extending into the radial slot 245. The cam lever is swung by reason of having a projecting stud or roller 250 at its rear side, extending into the cam groove 204 of the fixed cam 203. As the drum rotates therefore the play of the follower 250 in the stationary cam groove causes the swinging of the cam lever 246 and thereby the play of its stud 249 in the radial slot 245 of the arm 244 extending from the spindle 242 on which the grippers are mounted. It will be noted that as the cam lever swings, the stud 249 approaches the axis of the gripper spindle 242, and then recedes from it, at no time reaching such axis so that the spindle and grippers are kept under positive control. Moreover the advantageous action results in that, for each swinging movement of the gripper, the swing commences relatively slowly and easily, when the follower stud 249 is in the outer portion of the slot 245, but progressively speeds up as the cam lever swings, with maximum angular speed of gripper swing when the slot comes into line between the axes of gripper swing and of cam lever swing, the continued action slowing down the gripper swing, so that eventually it comes to its gripping position, or to its fully retracted position, with considerably reduced speed but adequate gripping pressure upon the blank upon the drum.

The start of each retraction of the jaws of each gripper pair effects the immediate release of the signature leading edge, and this is timed to bring about the discharge of each signature to the proper conveyor section beneath. In order to insure the continuance of the travel of the signature it is desirable to employ idler rollers 252 pressed resiliently against the signature somewhat short of the discharge point, thus to hold it frictionally against the drum disks, compelling the signatures to continue the advance with the rotation of the drum. An efficient arrangement for this purpose is shown in Figs. 11 and 14. Each of the pair of rollers 252 is mounted at the low end of a swingable arm 253, and these arms are fulcrumed at the ends of a cross rod 254, which also gives support to a pair of coil springs 255, one for each idler roller, to press the arms and rollers toward the drum as described. These parts are shown mounted upon a fixed depending bracket arm 256 which, at its upper end, has a hub 257 clamped upon a fixed transverse stud 258 projecting frontwardly from a socket or collar 259 bolted to the front side of the longitudinal frame casting 34. A desirable feature associated therewith consists of a pair or set of guide strips 261, mounted upon any convenient fixed part, such as the stud 258, these strips being spaced slightly outwardly from the drum, opposite to the respective drum disks 189 and 190; this expedient insuring that the traveling signatures will not become loose or depart materially from the surface of the drum, in which the idler rollers 252 cooperate.

The next mechanism of the machine is the signature conveyor means F, including an endless traveling chain with group pushers, but this mechanism is so intimately combined in several respects with the following described or jogger mechanism G that the two must be described together to a large extent, since a part of the driving means for the conveyor chain with steady travel serves also in part for driving the jogger chain with pulsating travel. Considering first the conveyor mechanism, with reference especially to Figs. 20 to 23, the endless chain 264 passes around an upright sprocket wheel 265 at the left and a similar sprocket wheel 266 at the right. The chain is provided with a series of upstanding pusher pins 267 each of which has its lower part attached rigidly to the chain and its upper part offset frontwardly so as to stand in line with the similarly offset jogger chain pins 303 to be described. At the end of the rightward travel the conveyor chain and pins pass downwardly around the righthand sprocket wheel and thence leftwardly and upwardly around the lefthand wheel. The figures referred to are extensively broken away in the middle, eliminating almost all of the mechanisms other than the conveyor and jogger.

The lefthand sprocket wheel 265 is mounted on a transverse shaft 268 turning in bearings 269, the bearings being combined by a cross support which may slide leftwardly upon a pair of parallel guides 270, and a longitudinal adjusting screw 271 is provided for shifting the bearings leftwardly to take up slack in the conveyor chain. The righthand sprocket wheel 266 is mounted on a transverse shaft 274 which turns in an extended bearing 272 mounted on a bracket 273. Fast on the front end of the sprocket shaft 274 is a collar 275, which may be coupled with another sprocket wheel 277 fast on the front end of the shaft. A sprocket chain 278 is engaged with the wheel 277 and extends at a downward rightward slant to a lower sprocket wheel 279 on the low shaft 280, which extends between its front and rear bearings 281 and 282. Near the rear end of the low shaft 280 is a spur gear 284 driven by a similar gear 285 upon a transverse shaft 286 turning in front and rear bearings 287 similar to those of shaft 280. The shaft 286 beyond its rear bearing carries a bevel gear 288 meshing with a similar gear 289 on the main shaft 90.

The train of mechanism thus described for the conveyor chain delivers, from the main shaft, the desired steady travel of the conveyor chain at a speed such that each chain section, in front of each pusher pin, will travel the distance between two hoppers or gathering sections in the period of a single cycle of gathering action. The pins, as usual, are adjustable on the chain so that their spacing, for any given speed of travel, can be adjusted to give the desired results, namely the advance of the chain by the distance of one of its sections during the period, such as one-half second required to deliver the successive extracted signatures to the conveyor chain.

As a supplementary provision Figs. 20 and 21 show a safety clutch device 292 operating between the shaft 286 and gear 285, this having a resilient clutch disengagement feature permitting the shaft to turn in an emergency without turning the gear. Being on conventional lines this is not described in detail, but preferably it is such that when the members are reengaged they will be in their correct coordination, between the main shaft 90 and the shaft 286 through which the conveyor mechanism is driven; and a switch 294 may be added, arranged to open and discontinue the drive when the safety device operates the switch.

Coming now to the jogger mechanism G, starting with the jogger chain 300, this, with its jogging pins 303, is required to advance with fast and slow motion relatively to the steady advance of the conveyor chain, the jogger pin for each conveyor section operating well ahead of the conveyor pin, so that each relatively retracting motion of the jogger pin will act upon the leading edges of the signatures and jog them into alignment. Each jogger pin therefore is spaced well ahead of the conveyor pin with which it cooperates, but only slightly behind the conveyor pin of the next section ahead. The train of connections for driving the jogger chain may commence with the same transverse low shaft 280 that operates the conveyor chain, but with a special device between that shaft and the jogger chain to afford its pulsating or variable fast and slow advancing motion, as will be fully described. On Fig. 22 are illustrated the conveyor or pusher pins 267 of two sections, and the jogging pin 303 of the second of those sections, said jogging pin being shown both in its relatively more advanced and its relatively more retracted positions. The more advanced position of each jogger pin leaves a greater lengthwise extent of conveyor section open to receive each signature, as is necessary in order to allow for irregularities in the delivery and reception of the signatures; but the jogger means is so timed that when each signature is safely within the conveyor section the jogger pin relatively retracts to the dotted position shown in Fig. 22, thus nicely aligning the signatures endwise.

Starting the description of the jogging mechanism with the chain 300, as was done with the conveyor mechanism, the jogger chain passes around a vertical sprocket wheel 301 at the lefthand end and a similar wheel 302 at the righthand end. The jogger chain is longer than the conveyor chain, thus better permitting separate mountings and take-up means for the chains at the lefthand ends thereof. The chain 300 carries a series of jogger pins 303 spaced apart to the same extent as are the conveyor pins 267. At the left end the sprocket wheel 301 is mounted on a shaft 304 which turns in bearings 305 on a sliding support or cross frame, and for chain take-up purposes there is provided an adjusting screw 306, corresponding to the screw 271 for the conveyor chain.

Tracing on the drawings the drive connections for the jogger chain 300, the righthand sprocket wheel thereof is shown mounted on a sleeve-shaft 308, which turns within the bearing 272 and surrounds the interior conveyor sprocket shaft 274, acting as a bearing for it. The transverse hollow shaft or sleeve 308 extends frontwardly, whereat it carries a front sprocket wheel 309, fast on the shaft. There is engaged on said front sprocket wheel a sprocket chain 310, which extends downwardly and rightwardly to where the chain is engaged upon a lower sprocket wheel 311 loose upon the low shaft 280. If now the sprocket wheel 311 were fast upon the low shaft 280 it would operate the same as the adjacent sprocket wheel 279 thereon, causing both the conveyor and jogger chains to travel identically. As stated, however, the lower sprocket wheel 311 of the jogger train of connections, and its hub 312 are loose upon the low shaft 280, so that they may be given variable or fast and slow rotational movements; and the problem therefore is to communicate drive from the low shaft, turning steadily through the spur gear 284, to the low sprocket wheel 311 and its hub 312 of the jogger driving connections. This fast and slow drive mechanism, combined with the steady drive connections for the conveyor chain is illustrated in Figs. 20, 21 and 23, being front, top and righthand views, along with the enlarged front view of Fig. 24, describable as follows.

Attached to the hub 312 of the lower sprocket 311 of the jogger connections is a spur gear 314, which therefore turns loosely on the low transverse shaft 280. For the common attachment an elongated bushing 315 is provided to which the elements 311, 312 and 314 are secured. This spur gear 314, while partaking of the common rotation of these parts, has a relative motion consisting of a short oscillation, imposed upon the general rotation, so that not all of the teeth of the gear 314 come into play, and indeed this element could be reduced to a mere toothed segment, and may be referred to as the inner segment of the mechanism under description. Just to the rear of the gear or inner segment 314 is the hub 317 of a crank arm 318, the outer end of which is enlarged into a bored head or bearing 319. The hub 317 is fast upon the shaft 280, as by being clamped tightly thereon. Rotatable in the outer head 319 of the crank arm is a short shaft or rockaxle 321, extending parallel to the low shaft 280. At the front end of said rockaxle is an outer toothed segment 322, whose hub is keyed to the rockaxle, so that the rocking thereof may effect the oscillation of the outer segment, the teeth of which are in mesh with the inner segment 314. Were the rockaxle 321 anchored in the crank arm 318, obviously the two segments could have no play and the jogger connections would operate the same as the conveyor connections, whereas by rocking the outer segment, the inner segment is oscillated thus imposing upon the jogger connections a relative acceleration and then deceleration supplemental to the otherwise steady rotation of all connections.

The rocking of the outer segment 322 to deliver relative movements to the inner segment and connected parts is shown as performed by means of a cam arm 324, the hub 325 of which is clamped fast upon the rockaxle 321, and this cam arm at its swingable extremity carries a roller 326. Said roller has only to be oscillated during the general rotation in order to cause the desired play of the outer and inner toothed segments. For this purpose a cam is desirable, and is illustrated in the form of a cam groove 328 formed in the front face of a cam disk 329, which is preferably stationary. The cam disk is mounted at the top end of one of the upright frame posts 33, the cam disk for angular adjustment being formed with concentric slots 330 engaged by headed bolts 331, Figs. 23 and 24, the shanks of which are extended into the curved top portion 332 of the post 33. An effective contour for the cam groove 328 is a simple circular form slightly eccentric to the shaft 280, thereby giving a highly smooth action, with gradual acceleration and deceleration, communicated through the cam arm 324 to the outer and inner segments, and thereby as a relative movement to the sprocket wheel 311 through which the jogger chain is advanced so that, by superimposing the oscillating effect upon the otherwise steady operation of the parts, the fast and slow pulsating advance motion of the jogger chain is afforded. In order to maintain tight the jogger and conveyor chains 310 and 278, between the lower and upper sprockets, conventional take-up devices 335 are shown.

The two chains 264 and 300 and their actuation as thus described afford an advantageous operation; the conveyor chain advancing at uniform speed, such as the length of two gathering sections per second, while the jogger chain advances with its fast and slow or pulsating movement, with an average speed the same as the steady speed of the conveyor chain. In practice this relative or pulsating movement may be of the order of one inch, so that the space between one pusher pin 267 and the jogger pin 303 ahead of it may be one inch more than is necessary to accommodate a signature. At the time of discharge from each drum to each conveyor section the receiving space between pins 267 and 303 therefore makes adequate allowance for the safe reception of the signature in the receiving section of the conveyor. The pusher pin may be timed to afford a slight clearance in front of it as the signature is fed into place, thus minimizing possible lack of coordination between pin and signature. A small amount of variation in the gripping of the signatures on the drum, and their discharge, is inevitable, and this condition is taken care of by the arrangement of the pusher pins just described, each signature landing slightly ahead of its pusher pin. No buckling of the signature can therefore occur, while each signature will shortly be brought back into registering position against the pin. Each signature falls into place freely and correctly with clearance at both ends, and choking of signatures, a common defect, is substantially eliminated. Each jogger pin need be placed on its chain only sufficiently ahead of the following pusher pin to carry out these advantages while permitting the pulsating action of the jogger pin, as seen in Fig. 22 to bring each new signature correctly into register against the pusher pin, thus truly heading up the several signatures of each group being accumulated. Another advantage attained by the described jogging chain and action is as follows. Sometimes very quick or abrupt stoppages of the machine are necessary, especially after a caliper has detected a faulty signature or the absence of a signature; the sudden stoppage being desirable in order to prevent the momentum of the machine from carrying the parts slightly beyond the position at the time of power throw-off, which would have the tendency to carry each signature group slightly under the next gripper drum, thus rendering the defective signature less accessible for correction or removal, and more difficult to handle. It is therefore customary to supplement the power throw-off action, by means of the relay switches in the conveyor drive or in the detecting mechanism, by adding a brake, which is applied, as to the main shaft 90, simultaneously with the termination of drive. Such a brake is not herein shown, the principle being well known of braking and stopping the parts of a machine upon the occasion of terminating the power drive thereof. The resulting quick stoppage of a gathering machine would have a tendency to displace bodily the accumulating groups in the conveyor and even to scatter somewhat the signatures in each group. With the present invention as described however these defects are substantially eliminated by reason of the described continuous cooperation of the upstanding pins of the conveyor chain and the jogger chain respectively.

In regard to the return stretches or lengths of the conveyor and jogger chains 264 and 300, these travel back longitudinally to their lefthand sprocket wheels, with their pins 267 and 303 depending from the return stretch, which is relatively slack. It is desirable to protect the return elements from possible conflict and for this purpose there is shown, see Figs. 20 and 23, a longitudinal box or enclosure 337, upon the upper edges of which the chains may slide, while the pins depend into the space within the enclosure, which is supported fixedly in position by a fixed bracket 338 supported from a longitudinal frame rod 339.

Coming next to the detector mechanism H, this comprises essentially a caliper or gaging means for determining the thickness of each signature which is handled, or the absence of signature, this operating between the concentric peripheral surface of a wheel or sector turning with and adjacently to the drum and an opposed roller contact; the effect of the gaging action being transmitted to a trip device which, when tripped, throws a switch or relay to effect the stoppage of the machine and operate a signal showing the location of the inaccuracy. The primary element of this mechanism may be considered as the contact wheel or sector, or pair of sectors 350 located adjacently alongside of the rear disk 190 of the extractor drum, shown in Figs. 1 and 16 and referred to in describing the drum. This contact wheel 350, or the sectors which compose it and their common hub were described as freely rotatable by the provision of a ball bearing 351 surrounding the drum shaft bearing piece 198 and held in position as one of the spacing elements between the drum rear disk 199 and the frame casting 34. For the avoidance of vibration and wear the gaging wheel 350 is thus mounted independently of the drum; for if the gaging wheel were attached to the drum it would partake of all vibrations and other inaccuracies produced by unbalance or by looseness and wear of the mountings of the drum. At the same time the gaging wheel should rotate substantially with the drum so that each of its peripheral gaging surfaces will travel around in coordination with the drum and with the signature under extraction, for the gaging of such signature. The rotation of the separate segment wheel 350 therefore is effected from the drum or its shaft, as by means of a short interconnecting pin 352, having an engagement with both the drum and the double segment which engagement is more or less loose rather than rigid and yet is adequate as a driving means operated by or with the drum to turn the gage wheel, this loose fitting of the parts being indicated in Figs. 11 and 16, the pin operating in a radially elongated slot 352'.

Passing to Figs. 11 to 15, the calipering double segment or wheel 350 is shown as formed with a hub 353 between which and the bearing piece 198 is the ball bearing 351. At its periphery each of the segments has a widened rim 354 of substantial angular extent and this rim may be considered as comprising a tapered extent 355 of approach or outward slant from the point marked X to the point marked Y on Fig. 11, this being smoothly followed by a concentric gaging surface 356 running from the point Y to the point Z, this latter surface being ground to high concentric accuracy, comprising as it does one of the opposed gaging or contact members 350 and 360 of the caliper which must detect the presence or absence of minute thicknesses such as those of paper. The eccentric surface rise 355, merging into the gaging continuation 356, prevents shock as each signature enters between the opposed member. The gaging point 358 is marked with a star, being the point of tangential contact between the segment, or the signature thereon and, outwardly thereof, the gaging roller 360, comprising the other contact element of the gage.

The gaging roller 360 is preferably slightly crowned or convexed, as indicated in Figs. 11 and 14, thus to avoid a too extensive gaging contact, while at the same time avoiding a line contact between the crowned surface of the outer gage member 360 and the cylindrical surface of the inner member 350. The gage roller 360 can turn freely on a central fulcrum or pin 361, and this bearing pin extends not only through the roller but through front and rear short arms 362 and 363, which embrace the roller, and which extend at a downward slant from a fixed pivot pin 364 which in turn extends between a short front drop bracket 365 and a similar but longer rear bracket 366, both of which are stationary during operation although being movable in unison for adjustment purposes as will be explained. Extending upwardly from the rear end of the fulcrum pin 361 of the roller, and attached rigidly thereto is a long upright arm or lever 368, this preferably being an extension of the rear short arm 363, the upper end of the long vertical arm 368 being arranged to take part in the tripping action to be described. See Fig. 12'.

Thus great multiplication of gaging effect is afforded. The fixed axis of pin 364, the axis of pin 361 swingable by the signature and the top of tall lever arm 368, form a triangle which swings amply at its upper corner so as to operate the trip with but a small difference in signature thickness. The gage roller, ground for high accuracy, is rotated by the travel of the signature against it. The ratio of the length of lever 368 above pivot 364 to the distance the fulcrum 361 lies below 364 may be 16 to 1, representing the multiplication.

Departing from the gaging action, an auxiliary expedient to minimize inaccuracy consists in a light scraper 370 that is mounted to bear upon the periphery of the gaging roller 360 thereby to maintain clean the roller surface against the accumulation of lint or other foreign matter. The scraper is shown as a piece of thin strip material, and it is supported by strips or bent portions 371 extending from the scraper to a cylindrical support 372 pivoted by means of a crosspin 373 upon a pair of arms 374 and 375, front and rear, which are preferably continuations, at an upward leftward slant, of the short arms 362 and 363 between which the fulcrum pin 361 of the gage roller is mounted. The light pressure of the scraper upon the rim of the roller may be maintained by the gravity of its own weight or by an added spring.

Reverting to the mountings of the gage roller 360, and the long upstanding trip lever 368, which latter may be considered as the primary or lower member of the trip device cooperating with the secondary or upper member to be described, the depending bracket arms 365 and 366 have been described as supporting the pivot or axle 364 about which the parts 363 and 368 swing by the action of a signature on the segment 350. The respective drop brackets are formed with opposite bosses 367 in which the horizontal axle 364 takes its bearing. The two drop brackets 365 and 366 are rigidly interconnected as a unit, which unit is stationary during operation, but may be tilted or adjustably swung to predetermine the position of the parts for operation on any given thickness of signature. Thus, as seen in Figs. 11 and 14, and separately in the top view of Fig. 15, a tiltable yoke 377 is provided, from a central part of which the long rear bracket arm 366 depends; and the yoke at its front end is provided with a closing bridge or bar 378, bolt-attached to the yoke, and from which the short front bracket arm 365 depends. The two bracket arms are integral or rigid with the yoke member and bridge arm respectively so that, when tilted, these parts swing as a unit for adjustment purposes. The yoke has a hub 379 in the nature of a sleeve through which and through a corresponding part of the bridge bar extends a fixed stud 380 having a collar 381 at its front end to confine the yoke and having a nut 382 applied to the reduced rear end of the stud to mount it rigidly upon a portion of the frame casting 34.

The importance of the tilting adjustment of the stationary bracket-pair 365, 366, will be understood by considering that the signatures which are supplied to each of the series of hoppers and gathering sections may vary widely in thickness, for example, from a single sheet up to 32 or more thicknesses; whereas any change of thickness tends to dislocate the cooperating members of the trip device. By the tilting adjustment of the drop bracket the entire gaging system, from the roller 360 to the tall trip lever 368, is bodily shiftable from and toward the gaging segment 350 about a fixed axis, being the axis of the stationary stud 380 upon which the drop bracket is tiltably mounted. Taking the case of a gathering section wherein, on a new job, a relatively thin signature is to be replaced by a relatively thick one, this change itself would tend to throw the trip lever 368 rightwardly from its desired central or neutral position. If now the depending bracket be adjustably shifted slightly toward the left in Fig. 11, this permits the gage roller 360 to shift relatively to the right, causing the short supporting arms 362—363 to swing upwardly or counterclockwise about the pivot pin 364 on the drop bracket, thus adjustably shifting the top end of the trip lever 368 toward the left, permitting it to be brought back into its neutral position, whereat there is no tripping action, with high exactitude.

The illustrated means for thus adjustably tilting the stationary drop bracket 365—366 will now be described. The long or rear drop bracket arm 366 is extended downwardly far beyond the short opposite arm 365, and the long arm at its lower end is formed into a head 384 which is bored and threaded to receive an adjusting screw 385. The adjusting screw protrudes rightwardly from the bracket head 384 and its extremity comes into adjustable contact with a permanently fixed abutment 386. Instead of a positive connection between the adjusting screw and the abutment, their constant contact is secured by means of a strong spring 387 extending from a pin provided at the rear of the bracket head 384 to a pin extending frontwardly from the triangular fixed bracket 259 previously mentioned, which bracket has a frontwardly extending stud 258 taking part in other than the calipering operations. The fixed abutment member 386 is shown as a downwardly projecting part whose upper end is formed with a collar 388 made fast, as by a set screw, with the fixed stud 258. The abutment piece 386 may be considered as permanently fixed with its lower left surface in position for contact by the end of the adjusting screw 385, while the turning of said screw causes changes in the tilted position of the long bracket arm 366, with micrometer fineness of adjustment. The adjusting screw has a thumb piece 389 for operating it, thereby to adjust the gaging mechanism for the signature being handled, while a locking nut 390 is also engaged on the adjusting screw, serving to fix the adjustment thereof by turning the nut 390 against the bracket head 384 through which the screw extends. In practice, to set any one of the detecting mechanisms to the signature in the corresponding section, a specimen of the actual signature will be placed between the gaging surface 356 of the segment 350, allowed to remain stationary for the purpose, and the other gaging member or roller 360. If the top end of the trip lever 368 is in an active position rather than a neutral position then an adjustment must be made to restore it to neutral position so that, with correct signatures, no tripping will occur. The locking nut 390 is first retracted, and thereupon the adjusting screw 385 is turned by its thumb piece, so as to tilt or to change the tilt of the drop brackets upon which the primary trip lever and associated parts are mounted; this operation causing an adjusting swing of the primary trip lever, by which it is readily restored to neutral position, whereupon it is only necessary to tighten the lock nut 390, and the gatherer section is in readiness for operation.

Referring to the right and left swinging movements of the tall trip lever 368, it is desirable to provide a limit plate 393 somewhat to the left near the upper end of the lever. This is preferably spaced away so that in actual operation the leftward swing of the lever will not reach the plate, the stopping of the swing being effected by the contact of the gage roller 360 upon the segment 350 or upon the signature thereon. The limit plate is shown mounted on a bracket 394 upstanding and offset frontwardly from the frame casting 34. Resilient means is desirable to exert a constant yielding pressure of the gage roller toward the gage segment, and for this purpose a spring 395 is conveniently located at a high point on the trip lever 368, extending from a point of attachment upon said lever leftwardly to a point of attachment on the limit plate 393. The pull of this spring normally causes the gage roller to press against the segment.

The tripping device as a whole comprises at least one trip piece or lug 397 upon the swingable tall lever 368, and at least one complementary or upper trip piece upon a movable trip head above, one or the other of the trip members consisting of two trip pieces, spaced apart to produce a gap or gateway between them, while the other trip piece normally passes into and out of said gap, by reason of the regular reciprocation of one or the other of the members, so that normally no cooperative tripping action occurs, whereas when the primary trip member becomes offset by an incorrect or missing signature, the entrance of one trip member into the gap or gateway of the other will be missed, and the mechanical action will occur which can be utilized to bring about the desired control. Specifically there is herein shown a single primary trip piece 397 at the top of the trip lever 368, this member being of triangular prismatic form, with a flat side upwardly, as shown, secured to the lever by a bolt 398, while thereabove is provided a trip member consisting of a spaced apart pair of secondary trip pieces 400, each depending from a pivot 401 and each having its lower end pointed or forked so as to give effective mechanical coaction with the triangular primary trip piece below, when the latter has been offset as by an incorrect signature, thus to bring about the tripping action and the desired control.

The upper or secondary trip member, comprising the left and right pivoted trip pieces 400, comprises also a trip head or block 402, on which the pieces are mounted, and which is reciprocable downwardly and upwardly with the front end of an oscillating carrier or lever arm 403, to be more fully described. The head 402 carries also at its front center a projecting lug or abutment 405, against the opposite sides of which a pair of stop screws 406 contact, one screw being fitted upon each of the trip pieces 400; so that the trip member may be initially set correctly to perform its functions. When the trip pieces have been so adjusted, their set screws may be so held by lock nuts 407. To hold the trip pieces toward each other, with the predetermined gap between, a cross spring 408 may be used, pulling upon both pieces, and having the advantage that the pieces may yield outwardly when necessary to avoid breakage. The adjusting screw stops 406 may be initially set to afford an ample gap, with good clearance for the entry of the primary trip member, when relatively thick signatures are to be gaged; whereas for thin signatures the clearance must be smaller for reliable detection of errors; and the described arrangement provides these adjustments in a practical way.

Before completing the description of the control connections it is convenient first to describe the switch 410 through which the calipering means effects the controls including the machine stoppage. The switch may be of conventional kind with first and second buttons or pins 411 above and 412 below and interior circuit makers and breakers, unnecessary to show, being on known principles. A delicately responsive snap switch serves well, such as a marketed one known as Micro-Switch No. BK–RSX, containing a main circuit or relay operated by a main button 411 to control stoppage, and an auxiliary signal resetting circuit operated by a button 412.

The main circuits of all the switches normally remain made or closed, and they are in series, so that an error in any section breaks or opens the circuit which, as by relay, causes the shutoff of driving power, accompanied by a quick braking and stoppage. When in any section the upper button is depressed, in the manner to be described, the whole machine is thus stopped. The stopping button is preferably self restoring but naturally is held depressed by the prompt stoppage, until the power drive is resumed at will, as by a shunt circuit manually controlled.

The local or signal circuit in each section is normally open, no lamp being operated until the main button is pressed, which not only opens the power circuit but closes the local circuit and thus lights the lamp; the interior contacts that give this action being of the kind which remain in contact, keeping the signal circuit closed until, after correction, it is restored to open condition by the pressing of the lower button 412, provided for that purpose. Conveniently the resetting means may here be described. Below the reset button 412 is shown a reset lever 414, Figs. 13 and 14, this swinging up about a pivot 415, on a bracket 416. A front lever extension 417 carries a riser or strip 418 which in turn is joined to a long handle 419 extended frontwardly into easy access. The parts 414 to 419 form a rigid entity, being disposed as described to avoid conflict with other parts. When at any section the handle is depressed the reset button 412 is pressed to reopen the lamp circuit.

Resuming the description of the means by which the tripping device controls or operates the switch 410 for stopping and signaling purposes, the plan is that when the reciprocating trip head 402, on its oscillating lever arm 403, is blocked by any abnormal positioning of the primary and secondary trip members, this condition shall result in the pushing or depressing of the switch main or top button 411. Various mechanical devices may provide such result, an effective one being a combination of two rocklevers or walking beams as shown. The main rocking beam, Figs. 13 and 14, has a rear rockarm 421 and a front arm 422 interconnected by their hub 423 rocking on a fixed stud 424, constituting a fulcrum for the beam 421, 422.

To rock the beam lever its rear arm at its free end has a pivot 425 connecting it to a long link 426, see also Figs. 1 and 2, which is bent clear of various other parts; and the lower end of the link is pivoted to the end of a short rockarm 427, whose clamp-hub 428 is fast on the rockshaft 95, already described, which is cyclically rocked from the groove 122 of the main shaft cam 120 through the train of parts 124 to 130. By these parts the rocklever and connections to the upper trip member are given one downward and one upward movement per cycle.

The main walking beam lever 421, 422, near its fulcrum 424, has an attachment or extension 429, extending substantially upward and thence formed or bent leftward, toward the observer in Figs. 13 and 14, to constitute an upper stop, reaching well above the upper button 411 of the switch therebelow.

The second walking beam or rocklever 403, 432 is shown fulcrumed directly on the first. Its rear arm 432 may be in one casting with its front arm 403, which latter carries the trip head. This rocklever normally has no motion upon the first rocklever, merely partaking of its swing, but abnormally it may swing thereon, for which its hub 433 is fulcrumed on a cross stud 434 at the front end of the front arm of the first rocklever. When, in the downward swing or phase of the front arm 422 and carried lever 403, 432, the front end or trip head of the latter becomes blocked due to a signature error, the carried lever becomes converted from an idle to an active lever, its front end coming to a stop, its middle and hub being forced down by the downswing of arm 422, and its rear arm 432 being forced down for substantially twice the extent of the descent of the hub.

This downswing of the free rear end of arm 432, near the fulcrum 424 of the main rocklever, is herein utilized to press down the main button 411 of the switch, directly therebelow. The descent of arm 432 acts through a contact screw 435 thereon, which strikes directly upon the button, depressing it to cause prompt stoppage, with the parts holding their stopped position. By adjustment the screw 435 can readily be made to deliver exactly to the button the thrust necessary for its operation when the trip action calls for stoppage. The rear end of arm 432 also carries an adjustable upstanding contact pin or screw, below and adapted normally to bear upwardly against, the flat extension stop 430 on the first rocklever, as a means of determining the normal relation between the two rocklevers. The same screw 435 may serve both purposes, the upper adjustment being through the flat upper stop 430. The arm 432 at a mid-point is formed with a hollow boss 437 carrying a coil spring 438, as a resilient means for elevating the arm to normal position, with the contact screw 435 contacting the top extension 430; the spring bearing downwardly upon any convenient movable or fixed part, such as the top side of the switch 410.

*Preferred cycle of timed operations*

The actions of the component mechanisms that are performed and coordinated through cams or equivalent timing means may be outlined by the following illustrative example, representing a single cycle, caused by one revolution of the main cam shaft and outlining the complete manipulation, in each section of the machine, of each one of the successive signatures. The hopper (A) is a passive element; while the conveyor and jogger chains (F and G), being of continuous operation, do not enter into the cycle, excepting that in the timing of the other mechanisms the cycle is coordinated with the speed of the conveyor, each discharge of a signature in each machine section being into the rection or receiving space of the conveyor in front of one of its pusher pins. The timing of the other mechanisms is next set forth, approximately and relatively, as to the manipulation of each signature; and thus are disclosed the rules to be followed for the designing of the respective cams and other timing parts, avoiding the need of describing the physical contours of the several cams.

First will be recited the positions of the mechanisms at the point of time when the actions begin on each lowermost signature S in the hopper (A), and this starting condition is conveniently considered as the zero position of the machine; subsequent positions being describable by the approximate number of degrees (0° to 360°) beyond such zero. In the suction detacher (B), the sucker is initially high, contacting the underside of the triangular corner $S^5$ which is part of the leading edge $S^3$ of the bottom signature. At the same time the suction may be considered as already on, or applied, to grasp the signature corner; and since the principles of suction applying and releasing are conventional and well known, the timed valve means for turning on and off the pneumatic suction, are wholly omitted from the drawings, examples thereof being illustrated in various prior patents; the timing however to be as hereinbelow stated. The separator means, comprising (C) the signature depresser and (D) the stack lifter mechanisms, initially stands bodily retracted or outward; the depresser having its blade in its normal or raised position while the lifter has its adjacent blade in its normal or lowered position, with the two blades at approximately the same level, ready to be shifted inwardly. The constantly rotating drum (E) has its gripper open, but ready to close and grip the signature leading edge; and, the drum being shown of double size and half angular speed, with two opposite griper sets, the latter take turns on the successive signatures, each thereof being inactive during the action of the other, thus providing a desirably longer travel distance for the signatures, without loss of production. Coming to the detector means (H), the upper or vertically reciprocating trip member or forked finger pair is initially in its raised position, awaiting the action of the caliper upon the other or horizontally adjustable trip member; while the corresponding calipering member or segment, revolving adjacent to the drum, is approaching its gaging position opposite to the other gaging member or follower roller.

Such being the starting positions, the sequence of actions on each signature, the angular timing being stated in parentheses, may be substantially as follows: The sucker swings down (0–50°) and with it the signature corner $S^5$, opening a space or entrance gap thereabove. The separator swings inward bodily (10–70°) entering the gap above the detached corner and moving beyond the corner well along the leading edge $S^3$. The depresser lowers (10–70°), to depress the leading edge against the drum periphery in time to be gripped. At the same time the lifter rises (10–70°), with a pause (30–40°), thrusting upwardly against the stack to ease the frictional pressure on the signature below. The pneumatic suction is now cut off (20–40°); releasing the downswung signature, the sucker remaining lowered. The drum gripper jaw after swinging nearly to its abutment now contacts and grips the signature leading edge (80–100°); thus starting the extraction of the separated signature. During the following long dwell through which the recited mechanisms, except the extractor, remain idle, the detector actions are performed, as will be later described. In the separating mechanism the depresser rises while the lifter lowers, each to its normal elevation, while the combined separator swings bodily outward to initial position (270–340°); thus clearing the way for the next rise of the sucker while restoring the depresser and lifter for separation of the next signature. The signature having by this time been fully extracted, the sucker now swings up again (300–340°) to act upon the next signature; the suction being turned on again (320–340°) for the sucker to take hold of the next signature for repetition of the cycle. Finally, the gripper starts its opening movement (350–360°); thus at once releasing the signature accurately for its advancing discharge on to the traveling section of the conveyor, and the gripper thus becoming ready for a new operation, upon the second signature following.

Reverting to the detector operations, their timing is not critical, but may be indicated as follows, with reference to each one of the opposite revoluble gaging members or segments. The angular positioning of each of the segments relatively to the drum must be well behind the gripping point of the signature, as indicated in Fig. 11, wherein the segment has just reached the commencement of its full gaging position, with a concentric continuation of its gaging periphery well beyond this point, but preferably terminated some distance therebeyond, leaving ample periphery for the performance of each calipering action. These matters appear on Fig. 11 in the fact that the signature leading edge has been carried on the drum well beyond the gaging place, the trailing portion of the signature extending along the segment periphery and substantially therebeyond. It is while the other caliper contact or roller is traveling relatively along the concentric periphery of the segment, from the gaging commencement point shown in Fig. 11 to the tail end of the segment surface, whereat the roller runs off the segment, that the tripping devices come into action. According to the presence or absence of the signature on the drum and gaging segment, or the presence of an erroneous or defective signature, the gaging wheel takes minutely different positions, these gaging movments of the contact wheel being multiplied, by the long upright trip arm, to give the described horizontal shiftings of the lower trip member, which thereby either takes a normal position, as in Fig. 11, incurring no tripping action, or takes an abnormal position causing the tripping action and the stoppage of the machine, Fig. 11 showing the normal or non-operating position while Fig. 12 shows two abnormal or operating positions, causing stoppage by the control switch. Therefore, the reciprocating descent of the upper trip member is to be timed, in each cycle, by the forms of its actuating cam and connections, so that the operative descent of the upper trip member takes place while the traveling signature lies between the gaging periphery of the calipering segment and the opposed gaging roller. For example, the tripping action may occur at a time slightly later than the conditions seen in Fig. 11, namely, when the revolving segment has traveled a little further so that the wheel will stand somewhere near the middle of the arcuate length of the concentric portion of the segment periphery. The ascending return of the upper trip member may be timed to occur at any convenient point of time after its descent, but preferably well before the other revoluble segment arrives at full gaging position, with the next succeeding signature in place. After any stoppage all actions cease, to resume only after the defect has been cured and the power drive resumed.

There has thus been described a signature flatwise gathering machine constituting an illustrative example of the principles of the present invention; and since many matters of combination, operation, arrangement and structure may be variously modified without departing from such principles it is not intended to limit the invention to such matters except to the extent set forth in the appended claims.

What is claimed is:

1. In a signature flatwise gathering machine having a longitudinal series of hoppers for stacks of signatures disposed flatwise with their back side edges longitudinal and their transverse leading end edges underneathly exposed at the exit end of the hopper in each section of the machine, a continuously advancing longitudinal conveyor chain with a spaced series of pushers defining sections adapted to receive signatures to form accumulating groups, and an extractor drum below each hopper and above said conveyor continuous rotatable about an axis which is transverse to the direction of the conveyor path, and said drum having gripper means thereon for gripping each lowermost signature of the stack by its leading end edge and drawing it out in an extracting direction the opposite of the conveyor advance and transferring it down and around and at a low position releasing it for advancing discharge flatwise directly into a conveyor section traveling therebeneath, to be pushed along by its trailing end edge; the combination therewith of a suction detacher to operate upon the signature corner adjacent the leading and back edges of the lowermost signature in each hopper, the same mounted to engage the outer part of such corner and to swing down about an interior axis which is located at or near the lowermost signature level and extends diagonally well inward of the engaged part of said corner, thereby to detach swingingly such corner downwardly toward said extractor drum and gripper means; and timed means for coordinately actuating the conveyor, the extractor and the suction detacher; each of said hoppers being an elevated fixed structure of enclosing walls, with a substantially level floor for supporting the stack but terminating well short of the exit end of the hopper; and wherein the hopper contains interior wall ledges adapted to sustain edge portions of the stack at several points including narrow ledges sustaining the leading edges of the signatures beyond the floor termination.

2. In a signature flatwise gathering machine having a longitudinal series of hoppers for stacks of signatures disposed flatwise with their back side edges longitudinal and their transverse leading end edges underneathly exposed at the left-hand exit end of the hopper in each section of the machine, a continuously rightwardly advancing longitudinal conveyor chain with a series of pushers spaced thereon defining sections adapted to receive signatures to form accumulating groups, and a signature-transferring extractor drum below each hopper continuously rotating counterclockwise about an axis which is transverse to the direction of the conveyor path, and said drum having gripper means thereon for gripping each lowermost signature of the stack by its leading left end edge and extracting the same leftwardly and transferring it down and around and at a low position releasing it unopened for rightward advancing discharge flatwise into a conveyor section traveling therebeneath, to be pushed along by its trailing end edge; the combination therewith of a suction detacher for the leading corner adjacent the back edge of the lowermost signature in each hopper, the same mounted to engage the outer part of such corner and to swing down about an axis which is located at or near the signature level and extends diagonally well inward of the engaged part of said corner, thereby to detach swingingly such corner downwardly toward said drum and gripper and to leave an entrance gap between said detached corner and the stack above; and timed means for coordinately actuating the conveyor, the extractor and the suction detacher; each of said hoppers being an elevated fixed structure of enclosing walls, with a substantially level floor for supporting the stack but terminating well short of the exit end of the hopper; and wherein the hopper contains interior wall ledges adapted to sustain edge portions of the stack, including a narrow supporting ledge, substantially at the diagonal swing-axis of the suction detacher.

3. In a signature flatwise gathering machine automatically operated and timed, and having a longitudinal series of hoppers for stacks of signatures disposed flatwise with their transverse leading edges underneathly exposed at the exit end of the hopper in each section of the machine, a continuously advancing longitudinal conveyor chain below said hopper series and carrying a spaced series of pushers defining sections adapted to receive signatures to form accumulating groups, and an extractor drum below each hopper continuously rotatable about an axis which is transverse to the direction of the conveyor path, and said drum having closable gripper means thereon operable in each cycle for gripping the lowermost signature of the stack by its leading edge and drawing it out and transferring it down and at a low position releasing it for advancing discharge flatwise into a conveyor section traveling therebeneath, to be pushed along by its trailing edge; the combination therewith of a suction detacher with a carrying rockshaft on which the detacher is eccentrically mounted, to operate upon the signature corner at the leading edge of the lowermost signature in each hopper, the same mounted to engage the outer underneath part of such corner and to swing down about an interior axis which is located at or near the stack bottom level and extends diagonally well inward of the engaged part of said corner, thereby to detach and pull swingingly such corner downwardly toward said extractor drum and to leave a substantial entrance gap between said detached corner and the stack above; a separating means comprising a depresser adapted to oscillate down and up and on its down stroke operable in each cycle to enter such gap and depress the signature leading edge into the reach of said gripper means.

4. A gathering machine as in claim 3 and wherein the depresser works above and the detacher works below the corner of the lowermost signature; the detacher having a straight hollow shank fulcrumed on a diagonal axis exterior to one wall of the hopper, with an offset bend extending crankwise closely beneath said signature for its up and down swing, and the hopper having a ledge where such axis intersects the adjacent hopper wall.

5. A gathering machine as in claim 3, the depresser operating above, the detacher below such lowermost signature corner, the depresser being a blade mounted to shift bodily inwardly to enter safely the gap above the lowermost signature corner and then to lower to depress the leading edge; and actuating connections to cause such inshift and lowering in coordination.

6. A gathering machine as in claim 5 and wherein the said depresser actuating connections include a fixed cam, said depresser connections and the fixed cam thereof being adapted to operate in such way that the inshift of the depresser causes its lowering by the action of said fixed cam whose contour is adapted to lower the depresser during the latter part of its inshift.

7. A gathering machine as in claim 6 and wherein said actuating connections include an upright rockshaft carrying the depresser, and a lateral pivot carried on said rockshaft, and said connections being such that the depresser inshift is a swinging action about said upright rockshaft carrying it and its lowering is said downswing about a lateral pivot carried on said rockshaft.

8. In an automatic signature flatwise gathering machine having a longitudinal series of hoppers for stacks of signatures disposed flatwise with their transverse leading edges underneathly exposed at the exit end of the hopper in each section of the machine, and having a continuously advancing longitudinal conveyor below said hopper series and carrying a spaced series of pushers defining sections adapted to receive signatures to form accumulating groups, and having an extractor drum below each hopper continuously rotatable about an axis which is transverse to the advancing direction of the conveyor, and having means thereon operable in each cycle for gripping the lowermost signature by its leading edge and drawing it out and transferring it down and at a low position releasing it for advancing discharge flatwise into a conveyor section traveling therebeneath, to be pushed along by its trailing edge; the combination therewith of a suction detacher operable upon a corner at the leading edge of the lowermost signature in each hopper and mounted to engage such corner and to swing it down thereby to deflect and pull such corner downwardly toward said extractor drum and to leave a substantial entrance gap between said detached corner and the stack above; and a depresser member operable in each cycle to enter such gap and with to-and-fro bodily downward and return movements to lower the signature leading edge into the reach of said gripping means and to retract for a new operation; and said machine being characterized in that the depresser has a timing cam means for operating it in coordination with the detacher action to shift or swing bodily from an exterior retracted position into the gap between the detached signature and the stack above and thereupon to lower bodily to deflect the leading edge into the path of the drum gripper.

9. A gathering machine as in claim 8 and wherein is operating mechanism for the depresser comprising the timed means for swinging it into such gap, and a fixed cam means operable by the inswing thereof for lowering bodily the depresser.

10. In an automatic signature flatwise gathering machine having a longitudinal series of hoppers for stacks of signature disposed flatwise with their transverse leading edges underneathly exposed at the exit end of the hopper in each section of the machine, and having a continuously advancing longitudinal conveyor below said hopper series and carrying a spaced series of pushers defining sections adapted to receive signatures to form accumulating groups, and having an extractor drum below each hopper continuously rotatable about an axis which is transverse to the advancing direction of the conveyor, and having means thereon operable in each cycle for gripping the lowermost signature by its leading edge and drawing it out and transferring it down and at a low position releasing it for advancing discharge flatwise into a conveyor section traveling therebeneath, to be pushed along by its trailing edge; the combination therewith of a suction detacher operable upon a corner at the leading edge of the lowermost signature in each hopper and mounted to engage such corner and to swing it down thereby to deflect and pull such corner downwardly toward said extractor drum and to leave a substantial entrance gap between said detacher corner and the stack above; and a lifter member operable in each cycle to enter such gap and with to-and-fro bodily raising and return movements to lift slightly the overlying stack thereby to facilitate smooth and accurate extraction of the detached signature; said machine being characterized in that the lifter has a timing means for operating it in each cycle coordination with the detacher action to swing bodily from an exterior retracted position into the gap between the detached signature and the stack above and thereupon to rise bodily to engage and lift slightly the stack and thereafter, when the signature has been extracted, to return downwardly and outwardly to initial position; and being further characterized in that there is operating mechanism for the lifter comprising the timed means for swinging it into such gap, and a fixed cam means operable by the inswing of the lifter to cause bodily raising of the lifter.

11. In an automatic signature flatwise gathering machine having a longitudinal series of hoppers for stacks of signature disposed flatwise with their transverse leading edges underneathly exposed at the exit end of the hopper in each section of the machine, a continuously advancing longitudinal conveyor chain below said hopper series and carrying a spaced series of pushers defining sections adapted to receive signatures to form accumulating groups, and an extractor or rotor means below each hopper continuously rotatable about an axis which is transverse to the direction of the conveyor path, and said drum having closable gripper means thereon operable in each cycle for gripping the lowermost signature of the stack by its leading edge and drawing it out and down for advancing discharge flatwise to the conveyor; the combination therewith of a detacher means comprising a member adapted to pull down upon the corner at the leading edge of the lowermost signature, thereby to leave a substantial entrance gap between said detached corner and the stack above; and, in timed cooperation with said detacher means, an initially exterior separating means comprising a separate movable depresser blade operable in each cycle to swing inwardly and enter such gap and then by a lowering movement to depress the signature leading edge into the reach of said gripper means, and comprising also a separate movable lifter blade operable in each cycle to swing inwardly and enter such gap and then by a rising movement to press upwardly upon the stack to lift slightly the stack and so facilitate the extraction of the lowermost signature; with a common inswinging means consisting of an upright rockshaft on which said blades are both mounted to receive in unison their inward and outward movements by the rocking of said rockshaft; and with separate fixed cams for the respective blades having contours for causing the timed up-and-down movements thereof by reason of the swinging movements of the blades produced by the rocking of said rockshaft.

12. A gathering machine as in claim 11 and wherein the depresser blade is pivoted to the rockshaft for its cam-timed down-and-up movements, while the lifter blade is rigid with said rockshaft, and its fixed cam operates by lifting and lowering the rockshaft and thereby the lifter blade; and vice versa.

13. In a signature gathering machine of the type set forth having a stack support for signatures set flatwise thereon, with a detacher to engage the corner of the leading edge and deflect it downwardly and an extractor to grip each lowest signature via its leading edge and pull it longitudinally from the stack; in combination therewith a pair of blades having shanks, with the blades extending at a substantial angle to their shanks and adapted as a combined pair of blades to swing from an exterior initial position to an operative interior position below the stack near the leading edge of the lowermost signature and to retract outwardly, a carrier member mounted to rock about an upright axis above the extraction path of the signature, said blade-pair having their shanks mounted to swing with the rocking of the carrier between exterior and interior positions, rocking mechanism acting on the carrier to swing the blade pair inwardly after the detaching of the signature leading edge thereby to locate the same between lowest signature and stack, and thereafter to withdraw it therefrom, and two separate mechanical means, differently timed, acting on the swingable blades respectively, to lower one of them to depress the signature edge before extraction and to raise the other of them to lift the stack, during extraction.

14. In a signature flatwise gathering machine having a longitudinal series of hoppers for stacks of signatures disposed flatwise with their transverse leading edges underneathly exposed at the exit end of the hopper in each section of the machine, a continuously advancing longitudinal conveyor chain below said hopper series and carrying a spaced series of pushers defining sections adapted to receive signatures to form accumulating groups, and an extractor or rotor means below each hopper continuously rotatable about an axis which is transverse to the direction of the conveyor path, and said drum having closable gripper means thereon operable in each cycle for gripping the lowermost signature of the stack by its leading edge and drawing it out and down for advancing discharge flatwise to the conveyor; the combination therewith of a detacher means comprising a member adapted to pull down upon the corner at the leading edge of the lowermost signature, thereby to leave a substantial entrance gap between said detached corner and the stack above; and, in timed cooperation with said detacher means, a separating means comprising a movable depresser member operable in each cycle to enter such gap and then by a lowering movement to depress the signature leading edge into the reach of said gripper means, and comprising also a separate movable lifter member operable in each cycle to enter such gap and then by a rising movement to press upwardly upon the stack to lift slightly the stack and so facilitate the extraction of the lowermost signature; and timed means for coordinately actuating the conveyor, the extractor, the suction detacher and the separator in each cycle.

15. A gathering machine as in claim 14 and wherein the depresser and lifter are separate blades, mounted on a common carrying rocker exterior to the hopper and both shiftable inward in unison by the rocking of said rocker from an initial retracted exterior position in a generally diagonal direction to an interior position between the detached signature below and the stack above, and the depresser then lowering the lifter rising; and actuating means acting on the rocker for timing their inward movements to follow the downswinging of the signature corner and timing their said other movements to precede the gripping and extraction of the signature.

16. A gathering machine as in claim 15 and wherein the inshifting of said depresser and lifter is a bodily swing toward the signature corner gap and there is a common member or rocker for causing such inswing in unison; and the down-and-up movements of the depresser and lifter members are caused by separate horizontal arcuate fixed cams on which run follower rollers connected to the shanks of the respective members, the contours of said cams determining the acting and return movements of the members.

17. In a signature flatwise gathering machine having a longitudinal series of hoppers for stacks of signatures disposed flatwise with their transverse leading edges underneathly exposed at the exit end of the hopper in each section of the machine, a continuously advancing longitudinal conveyor chain below said hopper series and carrying a spaced series of pushers defining sections adapted to receive signatures to form accumulating groups, and an extractor below each hopper continuously rotatable about an axis which is transverse to the direction of the conveyor path, and said drum having closable gripper means thereon operable in each cycle for gripping the lowermost signature of the stack by its leading edge and drawing it out in a direction opposite to the conveying advance and down and around for advancing discharge flatwise to the conveyor; means operative in each cycle to pull down upon the corner at the leading edge of the lowermost signature, and to move the signature leading edge into the reach of said gripper means, and timed means for coordinately actuating the conveyor, the extractor, and other mechanisms in each cycle; and drive means for an extended series of rotatable extractor drums arranged in unit groups, comprising, for each unit group, primary sprocket wheels on all drum shafts, an endless local sprocket chain for each one of a plurality of small local groups of such wheels, a secondary wheel on one drum shaft of each of such local groups of wheels, a driving wheel on a shaft parallel to said drum shafts in each unit, and a common chain passing around said secondary wheels of such local groups and around said driving wheel.

18. In an automatic signature flatwise gathering machine having a longitudinal series of hoppers for stacks of signatures disposed flatwise with their transverse leading edges underneathly exposed at the exit end of the hopper in each section of the machine, and having a continuously advancing longitudinal conveyor below said hopper series and carrying a spaced series of pushers defining sections adapted to receive signatures to form accumulating groups, and having an extractor drum below each hopper continuously rotatable about an axis which is transverse to the advancing direction of the conveyor, and having means thereon operable in each cycle for gripping the lowermost signature by its leading edge and drawing it out and transferring it down and at a low position releasing it for advancing discharge flatwise into a conveyor section traveling therebeneath, to be pushed along by its trailing edge; the combination therewith of a suction detacher operable upon a corner at the leading edge of the lowermost signature in each hopper and mounted to engage such corner and to swing it down thereby to deflect and pull such corner downwardly toward said extractor drum and to leave a substantial entrance gap between said detached corner and the stack above; and a depresser member operable in each cycle to enter such gap and with to-and-fro bodily downward and return movements to lower the signature leading edge into the reach of said gripping means and to retract for a new operation; and said machine being characterized in that there is operating mechanism for the depresser comprising the timed means for swinging it into such gap, and a fixed cam means operable by the inswing thereof for lowering bodily the depresser.

19. In an automatic signature flatwise gathering machine having a longitudinal series of hoppers for stacks of signature disposed flatwise with their transverse leading edges underneathly exposed at the exit end of the hopper in each section of the machine, and having a continuously advancing longitudinal conveyor below said hopper series and carrying a spaced series of pushers defining sections adapted to receive signatures to form accumulating groups, and having an extractor drum below each hopper continuously rotatable about an axis which is transverse to the advancing direction of the conveyor, and having means thereon operable in each cycle for gripping the lowermost signature by its leading edge and drawing it out and transferring it down and at a low position releasing it for advancing discharge flatwise into a conveyor section traveling therebeneath, to be pushed along by its trailing edge; the combination therewith of a suction detacher operable upon a corner at the leading edge of the lowermost signature in each hopper and mounted to engage such corner and to swing it down thereby to deflect and pull such corner downwardly toward said extractor drum and to leave a substantial entrance gap between said detacher corner and the stack above; and a lifter member operable in each cycle to enter such gap and with to-and-fro bodily raising and return movements to lift slightly the overlying stack thereby to facilitate smooth and accurate extraction of the detached signature; and said machine being characterized in that there is operating mechanism for the lifter comprising the timed means for swinging it into such gap, and a fixed cam means operable by the inswing of the lifter to cause bodily raising of the lifter.

PAUL E. KLEINEBERG.
PIERRE LARIVIERE.

REFERENCES CITED

The following references are of record in the file of this patent:

UNITED STATES PATENTS

| Number | Name | Date |
|---|---|---|
| 893,510 | Juengst | July 14, 1908 |
| 1,023,568 | Juengst | Apr. 16, 1912 |
| 1,039,541 | Kast | Sept. 24, 1912 |
| 1,123,619 | Story | Jan. 5, 1915 |
| 1,153,295 | Dunnebier et al. | Sept. 14, 1915 |
| 1,203,109 | Gitzendanner | Oct. 31, 1916 |
| 1,646,230 | Berkowitz | Oct. 18, 1927 |
| 1,789,160 | Simmons | Jan. 13, 1931 |
| 1,951,300 | Zimmer | Mar. 13, 1934 |
| 1,977,369 | Ackley | Oct. 16, 1934 |
| 2,020,321 | Kleineberg | Nov. 12, 1935 |
| 2,030,656 | Royster | Feb. 11, 1936 |
| 2,163,732 | Kleineberg et al. | June 27, 1939 |
| 2,166,709 | Swanson | July 18, 1939 |
| 2,411,123 | Wood | Nov. 12, 1946 |